US010107907B2

(12) United States Patent
Nicoletti et al.

(10) Patent No.: US 10,107,907 B2
(45) Date of Patent: Oct. 23, 2018

(54) BOBBER FIELD ACOUSTIC DETECTION SYSTEM

(71) Applicant: Raytheon BBN Technologies Corp., Cambridge, MA (US)

(72) Inventors: Michael John Nicoletti, Johnston, RI (US); Matthew Patrick Daily, Portsmouth, RI (US)

(73) Assignee: Raytheon BBN Technologies Corporation, Cambridge, MA (US)

( * ) Notice: Subject to any disclaimer, the term of this patent is extended or adjusted under 35 U.S.C. 154(b) by 486 days.

(21) Appl. No.: 14/986,968

(22) Filed: Jan. 4, 2016

(65) Prior Publication Data

US 2017/0227638 A1  Aug. 10, 2017

(51) Int. Cl.
*G01S 15/89* (2006.01)
*G01S 15/00* (2006.01)
(Continued)

(52) U.S. Cl.
CPC .............. *G01S 15/89* (2013.01); *B63B 22/20* (2013.01); *G01S 15/003* (2013.01);
(Continued)

(58) Field of Classification Search
CPC ..... G01S 15/89; G01S 15/003; G10K 11/006; H04B 11/00; B63B 22/20; B63B 2207/02;
(Continued)

(56) References Cited

U.S. PATENT DOCUMENTS 2,422,337 A * 6/1947 Chilowsky ............... G01V 1/38
367/4
5,691,957 A * 11/1997 Spiesberger ............ G01S 19/14
367/3
(Continued)

OTHER PUBLICATIONS

Clites, et al.; "Providing Higher Throughput for a Single User With M-ary Orthogonal Walsh Codes," Oct. 16, 2014; The MITRE Corporation (4 pages).
(Continued)

*Primary Examiner* — Daniel Pihulic
(74) *Attorney, Agent, or Firm* — Daly, Crowley, Mofford & Durkee, LLP

(57) ABSTRACT

Embodiments described herein relate to generating an image of an acoustic field associated with an underwater region. A plurality of submersible sensing devices (SSDs) are disposed so as to be substantially separate from each other in an underwater region, wherein each respective SSD is configured to execute a sink/float mission. During at least a portion of the sink/float mission, within each SSD, an environmental sensor measures at least one environmental parameter, a position sensor detects position information, an acoustic detection sensor detects at least one underwater signal, and a data recording system records mission data. After the sink/float mission, a processor receives mission data from the SSDs and generates an acoustic field image. Advantageously, during the sink/float mission some SSDs can transmit an orthogonal high time-bandwidth signal to help prevent interference between SSD during acoustic detection.

20 Claims, 10 Drawing Sheets

(51) Int. Cl.
  *B63B 22/20* (2006.01)
  *H04B 11/00* (2006.01)
  *G10K 11/00* (2006.01)

(52) U.S. Cl.
  CPC ............ *G10K 11/006* (2013.01); *H04B 11/00* (2013.01); *B63B 2201/18* (2013.01); *B63B 2207/02* (2013.01); *B63B 2211/02* (2013.01); *B63B 2213/02* (2013.01)

(58) Field of Classification Search
  CPC ............ B63B 2213/02; B63B 2201/18; B63B 2211/02
  See application file for complete search history.

(56) References Cited

U.S. PATENT DOCUMENTS

| | | | |
|---|---|---|---|
| 5,995,445 | A | 11/1999 | Whitesell et al. |
| 7,149,150 | B1 | 12/2006 | Scarzello et al. |
| 2017/0227638 | A1* | 8/2017 | Nicoletti ............... G01S 15/89 |

OTHER PUBLICATIONS

Dosso, et al.; "Acoustic Tracking of a Freely Drifting Sonobuoy Field," May 2002; Acoustical Society of America; vol. 111(5); pp. 2166-2177 (12 pages).

Dosso, et al.; "Experimental Validation of Regularized Array Element Localization," May 2004, Acoustical Society of America; vol. 115(5); pp. 2129-2137 (9 pages).

Grasso, et al.; "A Decision Support System for Optimal Deployment of Sonobuoy Networks Based on Sea Current Forecasts and Multi-Objective Evolutionary Optimization," 2013; Expert Systems with Applications; vol. 40; pp. 3886-3899 (3 pages).

Holler; "The Evolution of the Sonobuoy Form World War II to the Cold War," Jan. 2014; U.S. Navy Journal of Underwater Acoustics; pp. 322-346 (27 pages).

Keller; "Navy Orders Pinging Active Sonar ASW Sonobuoys to Locate and Track Stealthy Enemy Submarines," Mar. 11, 2015; Military & Aerospace Electronics; pp. 1-9 (9 pages).

"Multipurpose Atmospheric/Underwater Expendable Dropsonde," Aug. 2015; SBIR.gov; pp. 1-5 (5 pages).

"On the Pulse," May/Jun. 2012; Digital Battlespace; vol. 4(3); pp. 30-32 (4 pages).

Osman; "Coherent Array Processing of GPS Sonobuoys," Apr. 2010; Department of Geomatics Engineering; pp. 1-208 (231 pages).

Rice; "A Prototype Array-Element Localization Sonobuoy," Dec. 1990; Naval Ocean Systems Center; pp. 1-52 (61 pages).

U.S. Department of Commerce; "Abstracts of Awards for Fiscal Year 2014," Small Business Innovation Research Program (13 pages).

Worcester, et al.; "Reciprocal Acoustic Transmissions: Instrumentation for Mesoscale Monitoring of Ocean Currents," Apr. 1985; IEEE Journal of Oceanic Engineering; vol. 0E-10(2); pp. 123-137 (15 pages).

\* cited by examiner

BOBBER FIELD ACOUSTIC DETECTION SYSTEM

STATEMENT REGARDING FEDERALLY SPONSORED RESEARCH

This invention was made with government support under the government contract HR0011-14-C-0073 of Apr. 7, 2014, awarded by the United States Department of Defense. The United States Government has certain rights in the claimed subject matter. This contract is hereby incorporated by reference.

FIELD

At least some embodiments described herein relate to surveillance and collection of data by instruments, such as bobbers or sonobuoys, disposed in a body of water and also to transmitting that data to an external processor for analysis. More specifically, certain embodiments described herein relate to systems, methods, and apparatuses that enable instruments to image larger expanses of the water faster, more efficiently, and more accurately than known techniques and to detect and localize objects disposed in bodies of water.

BACKGROUND

Sonobuoys (short for sonar buoys) are sonar system devices, often but not always expendable, that can be deployed from airplanes and/or ships and are able to detect and possibly identify fixed and/or moving objects located under water. Detection sonobuoys, for example, listen for sound waves that reach its hydrophone or transducer (e.g., power and/or propeller noises from underwater vehicles and/or ships), emissions from moving parts contained in or disposed on underwater objects, power plant, propeller or door-closing and other noises, etc., from ships or submarines, or other acoustic signals of interest such as an aircraft black box pinger. The sonobuoy then transmits the detected information to a computer for processing (e.g., on an aircraft or vessel).

Sonobuoys have been used to provide a variety of functions, including but not limited to surveillance of underwater environments, antisubmarine warfare (ASW), communication with sea vessels and/or submarines, determining location of and/or tracking targets, locating underwater objects (both passive and active, the latter including aircraft black boxes), mapping natural and man-made underwater objects, locating and tracking fish and marine mammals, and measurement of characteristics relating to bodies of water, such as ocean currents, ocean temperature, ocean salinity, and wind speed. Typically a sonobuoy is designed to scuttle (sink) alter a predetermined time, or when a predetermined action/event occurs. U.S. Pat. Nos. 4,590,590, 4,654,832, 4,689,773, and 5,073,136 are exemplary sonobuoy patents and each of these is incorporated by reference.

There are various sizes (A, B, C, etc.) and types of sonobuoys (including active, passive, and special purpose), having various capabilities (measurement, Global Positioning system (GPS) enabled/equipped, controlled buoyancy, etc.). GPS-enabled/equipped sonobuoys can be active or passive, used for detection or measurement purposes, and are able to provide positioning information along with acoustic information. Some sonobuoy systems are implemented to be monostatic, meaning that the transmitter and receiver are in the same place. Bistatic sonar describes when the transmitter and receiver(s) are separated (e.g., by a distance large enough to be comparable to the distance to the target), and multistatic sonar is a multi-node system with more than one transmitter, receiver or both. For example, a deployed field that includes a plurality of appropriately spaced sonobuoys can be implemented as a multistatic sonar system, where the sonobuoys transmit signals and listen back for the echoes from the received signals (as well as for other acoustic sounds).

FIG. 1 is an illustrative block diagram of an exemplary prior art sonobuoy system 10. Sonobuoys 10 are often implemented as a self-contained package of electronics designed to be dropped into a body of water, enter into the water, detect underwater acoustic signals, and relay recorded information 17 about those underwater acoustic signals that it received back to a source device, such as a sonobuoy receiver 13 located on an aircraft 15 or shipping vessel (not shown). Sonobuoys 10 can be adapted to both detect and track underwater sounds, as well as measure ocean characteristics. Some sonobuoys 10, such as the one illustrated in FIG. 1, are designed to separate into two portions 12, 16 tethered together via a cable 14, including an underwater acoustic sensor portion 16 and a surface transmitter portion 12. The surface transmitter portion 12 floats in or on the water surface and receives, via the cable 14, the acoustic signals 19 detected by the underwater portion 16, and then transmits the detected acoustic signals 19 via transmitted radio signals 17 sent to a sonobuoy receiver 13 (shown for illustrative purposes only as being on an aircraft 15) for further processing and/or for viewing by a user (not shown).

As the above-referenced patents illustrate, sonobuoys 10 also can include a casing or outer canister that includes many additional components, such as a parachute, hydrophone, cable packs, floats, sea anchor, and the radio transmitter and associated antenna. Some of these are further explained below. As shown in the prior art example of FIG. 1, depending on the type of sonobuoys (e.g., passive, active, special purpose, etc.) a sonobuoy also can include one or more hydrophones 22, 28 or other transducers (e.g., the magnetic compass 26) to record information about underwater sounds and/or emit "pings" or sensors (not shown). If the sonobuoy 10 is a passive sonobuoy used for detection, the sonobuoy 10 includes one or more acoustic receivers (hydrophone) 22, 28 to detect acoustic energy emitted by remote sources. If the sonobuoy 10 is an active sonobuoy, it may also include one or more components usable to emit sound waves (not shown), wait for and detect the reflection back of the sound waves, and provide this data to the transmitter 20, to be uploaded to a sonobuoy receiver 13 that uses this data to gather information about objects (fixed and/or moving) in the water. Sonobuoys can be directional or non-directional as well: in a directional sonobuoy the directional receiver/hydrophone 22 detects energy from a limited angular field of view, whereas in a non-directional sonobuoy, the omnidirectional hydrophone 28 receives energy from all directions.

The sonobuoy 10 also includes a battery 30 capable of operation in water; for example, special types of batteries capable of being activated by presence in sea water are known in the art, such as sea water activated magnesium or silver chloride, lithium chemistry, and/or thermal batteries. In addition, controlled buoyancy sonobuoys, which can descend to a predetermined depth and then ascend back up to a different depth, are known in the art (see, e.g., U.S. Pat. Nos. 5,224,074 and 5,460,556, which are hereby incorporated by reference).

For sonobuoys used for detection of underwater sounds (e.g., submarine noise and fish sounds, sounds emitted from underwater objects like airplane black boxes, etc.), the hydrophone 28 or similar transducer detects the sound, and the detected sounds modulate an oscillator (not shown) in the RF transmitter portion 20 of the surface portion 12 of the sonobuoy 10. Optionally, the sonobuoy can include one or more amplifier or other electronics to amplify the detected sound. The RF transmitter 20 radio output is a frequency modulated signal (e.g., a very high frequency (VHF) or ultra-high frequency (UHF) band signal) that is transmitted from the VHF/UHF antenna 18, and the antenna signal 17 is received by a sonobuoy receiver 13 (e.g., on an aircraft 15 or ship (not shown)), and then detected and processed by a user or processor (not shown) having access to the sonobuoy receiver 13. For example, U.S. Navy sonobuoys use the VHF maritime mobile band (156.0 and 162.025 MHz, inclusive) to transmit sonobuoy data to an aircraft or ship, in frequency channels that can be about 375 kHz wide.

By analyzing information about the detected sounds that have been sent to the sonobuoy receiver 30, an operator, or a processor (or both), can determine various characteristics of the detected object(s). For example, in detection of submarines, several sonobuoys may be deployed in a tactical pattern, each sonobuoy using a different VHF or UHF frequency, enabling an operator or processing computer to localize, track, and classify a submerged submarine.

Special-purpose sonobuoys (also referred to as measurement sonobuoys) are another sonobuoy type and are not used for detection and generally do not include hydrophones or transducers. Rather, these types of sonobuoys (sometimes referred to as measurement sonobuoys) instead include one or more sensors to gather information about different ocean characteristics. Special purpose sonobuoys may, for example, include sensors configured to provide specific functions, such as measuring salinity of ocean water, water temperature, air temperature, barometric pressure, wave height, electric fields, magnetic anomalies, and bioluminescence (the light emitted by microscopic organisms disturbed by a passing submarine) marking the location of something at sea or under the sea, or assisting in communications occurring between aircraft and submarines.

Another device having some functions similar to a measurement/special purpose sonobuoy, is a dropsonde, which is an expendable weather reconnaissance device designed to be dropped from an aircraft at altitude to more accurately measure weather and storm conditions as the device falls to the surface (of the ocean or to land). The so-called "sonde" portion can include a GPS receiver, along with pressure, temperature, and humidity (PTH) sensors to capture atmospheric profiles and thermodynamic data. A dropsonde can relay these types of data to a computer in the aircraft by radio transmission. Dropsondes do not provide acoustic detection features and have no acoustic transmitter.

SUMMARY

Information provided by and/or derived from at least some types of measurement sonobuoys (e.g., temperature profile information, sound velocity information, etc.) is generally incapable, by itself, of detecting underwater objects, but it has been found that use of information from measurement sonobuoys can be helpful in adjusting information used for detection, especially when the information is used in connection with information from detection sonobuoys. For example, measured sonobuoy data is very useful to help determine placement (e.g., appropriate depths) of detection and/or tracking sonobuoys. Other information from special purpose sonobuoys, such as water sound velocity information, also can be important for at least some underwater applications, because of the effect that variations in sound velocity have upon acoustic absorption and refraction. Sound velocity in water is affected by factors such as salinity, water pressure (or depth), and water temperature, but can be predicted by various formulas known in the art if these factors are known (e.g., by measurement using special purpose sonobuoys or by data provided from entities, e.g., the U.S. government, weather services, military services, etc.). Note that, if salinity is neglected, a so-called Sound Velocity Profile (SVP) can be calculated as a function of depth and temperature (since these factors cause the greatest variation in the speed of sound in seawater).

Use of GPS-enabled/equipped sonobuoys is advantageous in accurate target localization and antisubmarine warfare (ASW) operations, because the accurate locations that GPS provides enables processing information from an array of sonobuoys. In addition, coherent processing of an array of GPS-enabled sonobuoys can provide improvements in noise reduction during detection of acoustic signals. For example one sonobuoy system provides GPS-enabled digital sonobuoys that work with software-defined sonobuoy receiver technology to obtain information from a field of active and passive sonobuoys that are controlled and monitored by an airborne processor.

During transmission of signals from the sonobuoy 10 to the sonobuoy receiver 13, each sonobuoy operating within line of sight of the receiving aircraft/ship can be assigned its own channel in the available sonobuoy RF channels, usually, in traditional frequency-division multiple access (FDMA) processes, as will be understood in the art. This approach can increase the opportunities for interference as more sonobuoys and other users also utilize the sonobuoy RF channel space. For example, the VHF maritime mobile band can be assigned for other uses, such as land-based or maritime voice and other narrowband modulations 25 kHz or less, and it is possible that these uses can, at times, interfere with sonobuoy transmissions. In addition, the signals from active sonobuoys operating as part of an array of sonobuoys have the potential to interfere with each other.

Various vendors now provide controlled-buoyancy maritime sonobuoys that are used to measure some characteristics related to sound SVP, as well as information about ocean currents, water temperature, air temperature, barometric pressure, wave height, electric fields, magnetic anomalies, bioluminescence salinity, and wind speed. The controlled buoyancy sonobuoys are able to descend and ascend in water, but they do not provide detection capabilities. In addition, the use of prior art surface sonobuoys (sonobuoys that remain on the surface and do not gather information from below the surface) for submarine detection, for example as described above, is well established.

Known controlled buoyancy measurements sonobuoys generally do not have active acoustic subsystems. That is, it is believed that there are no existing sonobuoys that combine in one unit, as do certain embodiments described herein, features from both the special purpose sonobuoys and either the active or passive detection types of sonobuoys, as well as the information they provide. It is believed that there are no existing sonobuoy systems capable of using such sonobuoys to provide the further advantages, features, and functionality described herein in connection with certain embodiments, which features appear to not be possible in existing sonobuoy systems and/or existing arrays of sonobuoys. For example, it is believed that no systems exist that are able to provide, as do certain embodiments described herein, dynamically detected and processed information about an undersea area of seawater that is based not only on data collected from active or passive detection sonobuoys, but also on data relating to information such as SVP and other water characteristics that is obtained at one or more points during the same sink float mission during which acoustic data is being gathered, or at substantially the same time as detection data is gathered. In addition, known implementations of surface sonobuoys do not execute any sink/float excursions (i.e., do not have controllable buoyancy) and do not measure SVP.

Because of the limitations in existing sonobuoy systems, it is believed that no present sonobuoy system exists that can provide the advantages and features of at least some disclosed embodiments, such as gathering and using information in a way that enables the sonobuoy system (including, optionally, remote processors communicating with the sonobuoy) to invert the entire acoustic field of a body of water, such as an entire ocean and its boundaries.

Some sonobuoys, as noted above in connection with FIG. 1, separate into two portions and are capable of gathering various types of information while submerged and communicating it with a floating surface sonobuoy portion, which is tethered to the submerged portion, for communication of the information. However, because of the tethering between the surface portion and submerged portion, it is believed that no existing tethered systems are capable of imaging an underwater area from multiple substantially simultaneous locations and depths. Furthermore, it is difficult to deploy a significant number of tethered sonobuoys in any given area, such that the sonobuoys are densely deployed and can provide imaging of an underwater area from multiple substantially simultaneous locations. The tethering also limits the spacing between the sonobuoys.

In one aspect, an embodiment of a sonobuoy system, called a bobber field acoustic detection system (BFADS), is provided. In this document, the sonobuoys are also referred to as bobbers. In one embodiment, the bobber is a variable buoyancy unit (for example, a specialized type of sonobuoy) that goes up and down the water column (i.e., bobbing). BFADS is a distributed, multistatic, active sonar system that integrates together, in the same sonobuoy system, a device that includes integrated SVP, GPS, and acoustic transmitter/receiver devices, together with a controlled buoyancy system. These "bobbers" are deployed en masse over the area to be imaged and execute coordinated sink/float excursions while pinging and recording the SVP, positional, and acoustic data. In at least some embodiments, described further herein, the array of bobbers operates as a multistatic system, in that, during sink/float excursions, at least a portion of the bobbers transmit orthogonal high time-bandwidth signals and record acoustic returns during excursions. This data is recorded, then, when the bobber resurfaces after the sink/float excursion is complete, the data is off-loaded (e.g., via radio transmission) to a remote computation server and used to invert the acoustic field and image the entire ocean and its boundaries. In one embodiment, at least a portion of the bobbers remain on the surface to maintain GPS registration/connectivity.

In one aspect, embodiments are described herein that can take all necessary measurements to calculate the sound velocity as the sonobuoy/bobber goes up and down a water column, while at the same time the sonobuoy is acoustically interrogating the surrounding water environment, where in at least some embodiments the system combines these two actions at substantially the same time. In at least some embodiments, the system is capable of both gathering information sufficient to determine SVP and also acoustic information, but not necessarily at the same time (or always at the same time). Providing this combination of features, functions, methods enables, in at least some embodiments, faster and more accurate processing of the resulting detected acoustic signals, including the ability to do signal propagation correction based on actual environmental taken in the same region of water, as at least a portion of the detected acoustic measurements, which measurements can be taken substantially at the same time as acoustic measurements, close in time, during some other time during the sink/float mission, etc., where this combination is not possible with known sonobuoy systems.

In one embodiment, a system is provided for generating an image of an acoustic field associated with an underwater region. The system comprises a plurality of submersible sensing devices (SSDs) disposed so as to be substantially separate from each other in the underwater region, each respective SSD configured to execute a sink/float mission in water, the sink/float mission comprising movement of the SSD from at least a first depth in water to at least a second depth in water, and a processor in operable communication with the plurality of SSDs. Each SSD comprises an environmental sensor, a position sensor, an acoustic detection sensor, a data recording system, a buoyancy control system, and a communications system.

The environmental sensor is configured to measure, during at least a portion of the sink/float mission, at least one environmental parameter along at least a portion of a path taken by the SSD during a sink/float mission. The position sensor is configured to detect position information associated with the SSD during at least a portion of the sink/float mission, during a least a portion of the sink/float mission; wherein the position information further comprises at least one of: (a) a first set of position information taken at substantially the same time that at least one environmental parameter is being measured; and (b) a second set of position information taken at substantially the same time that at least one underwater acoustic signal is being detected. The acoustic detection sensor is configured to detect, during at least a portion of the sink/float mission, at least one underwater acoustic signal during, at least a portion of the sink/float mission. The data recording system is in operable communication with the environmental sensor, the position sensor, and the acoustic detection sensor, and the data recording system is configured to record a set of mission data during at least a portion of the sink/float mission, the set of mission data comprising data from the environmental sensor, data from the position sensor, and data from the acoustic detection sensor. The buoyancy control system is configured to control buoyancy of the SSD during the sink/float mission. The communications system is configured to transmit, at a predetermined time, at least a portion of the mission data from the SSD to a processor located remotely from the plurality of SSDs. The processor is configured to receive the set of mission data from at least a portion of the plurality of SSDs and generate an acoustic field image based at least in part on the received mission information.

In a further embodiment, the position information further comprises at least one voxel position of the SSD and wherein the processor is further configured to:

determine, based on the received mission data, a set of corresponding respective path, and voxel position information for each respective SSD in the portion of the plurality of SSDs, during each respective sink float mission undertaken by the respective SSD in the portion of the plurality of SSDs;

generate, based at least in part on the at least one environmental parameter, a propagation model of the underwater region;

perform a first adjustment of at least one of the path, voxel position, and detected acoustic signal information for each SSD based at least in part on the propagation model; and generate the acoustic field image based at least in part on the path, voxel position, and detected acoustic information after the first adjustment.

In one embodiment, the SSD further comprises an acoustic transmitter configured to transmit from the SSD at least one unique transmitted signal at a frequency compatible with transmission in water. In one embodiment, the unique transmitted signal comprises an orthogonal high time-bandwidth signal. In one embodiment, each of the plurality of the SSDs comprises an acoustic sensor configured to use two-way bi-static reflection sensing to detect acoustic signals. In one embodiment, the at least one acoustic signal comprises monostatic and bistatic reflected returns. In one embodiment, for a given respective SSD, at least a portion of the reflected returns comprise reflections based at least in part on the at least one unique transmitted signal sent from that given respective SSD.

In another embodiment, the processor is further configured to perform a second adjustment of at least one of the path, voxel position, and detected acoustic signal information based at least in part on information relating to two-way bistatic reflection sensing between two or more SSDs and to generate an acoustic field image based at least in part on the path, voxel position, and detected acoustic information after the first and second adjustments. In a further embodiment, the processor is configured to generate a sound velocity profile (SVP) based at least in part on the measured environmental parameter.

In one embodiment, at least a portion of the plurality of SSDs is configured to be synchronized in time during at least one sink/float mission. In one embodiment, the SSD comprises at least one of a sonobuoy, bobber, and dropsonde. In one embodiment, at least a portion of the SSDs are configured such that their respective transmitted signals overlap in interrogation radius without causing interference with other respective transmitted signals. In one embodiment, for at least a portion of the plurality of SSD devices, the first set of position information is taken at substantially the same time as the second set of position information.

In still another embodiment, a submergible sensing device (SSD) is provided, wherein the SSD is configured to execute a sink/float mission in water, the sink/float mission comprising movement of the SSD from at least a first depth in water to at least a second depth in water. The SSD comprises an environmental sensor, a position sensor, an acoustic detection sensor, a data recording system, and a buoyancy control system.

The environmental sensor is configured to measure, during at least a portion of the sink/float mission, at least one environmental parameter along at least a portion of a path taken by the SSD during a sink/float mission. The position sensor is configured to detect position information during at least a portion of the sink/float mission, the position information comprising at least one voxel position of the SSD, during a least a portion of the sink/float mission, wherein the position information further comprises at least one of: (a) a first set of position information taken at substantially the same time that at least one environmental parameter is being measured; and (b) a second set of position information taken at substantially the same time that at least one underwater acoustic signal is being detected. The an acoustic detection sensor configured to detect, during at least a portion of the sink/float mission, the at least one underwater acoustic signal. The data recording system is in operable communication with the environmental sensor, the position sensor, and the acoustic detection sensor, where the data recording system is configured to record a set of mission data during at least a portion of the sink/float mission, the set of mission data comprising data from the environmental sensor, data from the position sensor, and data from the acoustic detection sensor. The buoyancy control system is configured to control buoyancy of the SSD during the sink/float mission.

In one embodiment, the SSD device further comprises a communications system configured to transmit, at a predetermined time, at least a portion of the mission data from the SSD to a processor located remotely from the SSD. In one embodiment, the SSD device further comprises an acoustic transmitter configured to transmit from the SSD at least one unique orthogonal high time-bandwidth signal. In one embodiment, the at least one acoustic signal comprises monostatic and bistatic reflected returns and at least a portion of the reflected returns comprise reflections based at least in part on the at least one unique orthogonal high time-bandwidth signal transmitted from the SSD.

In one embodiment, a method of generating an image of an acoustic field is provided. The method comprises the unordered steps of:

(a) measuring at least one environmental parameter along at least a portion of a first underwater path;

(b) detecting, along at least a portion of the first underwater path, at least one underwater acoustic signal;

(c) detecting position information during at least a portion the first underwater path, wherein the position information comprises at least one of
 (c-1) a first set of position information taken at substantially the same time that at least one environmental parameter is being measured; and
 (c-2) a second set of position information taken at substantially the same time that at least one underwater acoustic signal is being detected;

(d) defining a set of mission data during at least a portion of the first underwater path, the set of mission data comprising the environmental parameter, the underwater signal, and the position information; and (e) generating, based at least in part on the set of mission data, a respective first acoustic field image associated with an underwater region defined around the first underwater path.

In one embodiment, the method further comprises the unordered steps of:

(f) simultaneously performing steps (a)-(d) for a plurality of separate and distinct underwater paths; and (g) generating, based at least in part on the respective sets of mission data from step (f), a second acoustic field image associated with an underwater region defined around the plurality of separate and distinct underwater paths.

In one embodiment, the method further comprises the unordered steps of:

(h) transmitting an orthogonal high time-bandwidth signal originating from at least a portion of the first underwater path; and (i) detecting, along at least a portion of the first underwater path, reflections based at least in part on the at least one unique orthogonal high time-bandwidth signal; and (j) including the detected reflections in the set of mission data.

Details relating to these and other embodiments are described more fully herein.

BRIEF DESCRIPTION OF THE DRAWINGS

The advantages and aspects of the described embodiments will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

Figure 1:
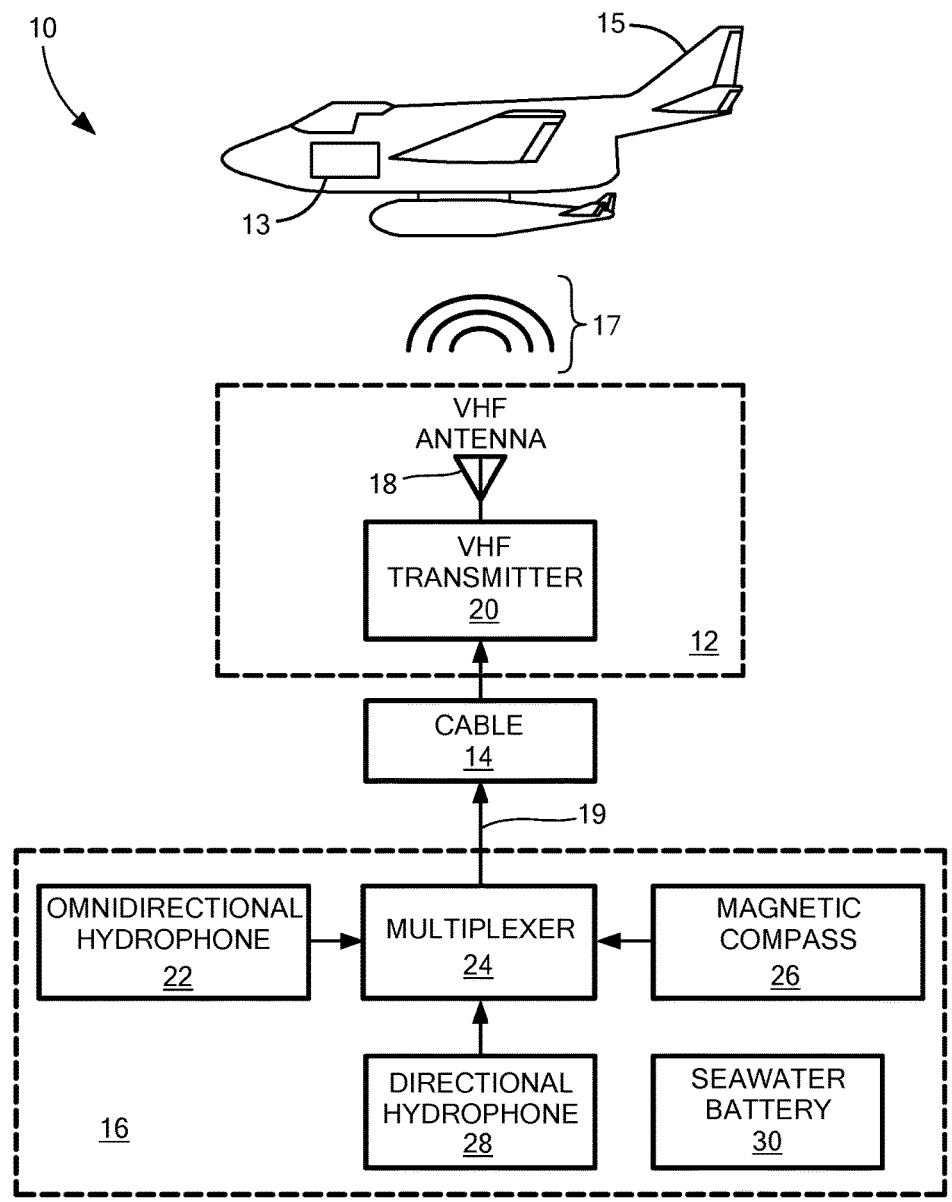
FIG. 1 is an illustrative block diagram of a prior art detection sonobuoy system.

Various systems and methods are described that incorporate some or all of the disclosed embodiments. Although these systems and methods are, at times, described in connection with frequencies used with and applications suited for the U.S. Navy anti-submarine warfare (ASW) systems, none of the disclosed embodiments are so limited. As those of skill in the art will appreciate, at least some of the disclosed embodiments may have application in many other fields, including but not limited to oceanography, communications, environmental monitoring, marine life monitoring, location of downed aircraft, surveillance of underwater environments, mine detection, submarine detection, unmanned underwater vehicle (UUV) detection, underwater wreckage location, communication with sea vessels and/or submarines, determining location of and/or tracking targets, locating underwater objects (both passive and active, the latter including aircraft black boxes), mapping natural and man-made underwater objects, locating and tracking fish and marine mammals, and measurement of characteristics relating to bodies of water, such as ocean currents, ocean temperature, ocean salinity, and wind speed.

Advantageously, in at least some embodiment, systems, methods and apparatuses embodying at least some of the disclosed embodiments are able to combine recorded information from submergible sensing devices (SSDs), where the term SSD as used herein is understood herein to at least include both expendable and non-expendable dropsonde devices, sonobuoys, bobbers, UUVs, underwater drones, and any and all devices now known or later developed that are at least capable of obtaining data while submerged in and/or floating on water and providing that data to a processor (whether built in to the SSD or remotely located) for analysis. Exemplary SSD devices can, in at least some embodiments described herein, include one or more built in sensing subsystems, including but not limited to GPS systems, acoustic transducers, environmental sensors (especially temperature, salinity, wind speed, and other relevant ocean parameters), position sensors, etc., systems for recording information detected by the sensors, acoustic transmitters capable of sending pings into the water, and communications transmitters capable of uploading information to a receiver that is remote from the SSD.

In at least some embodiments, systems implemented as described herein include the capability to process at least a portion of the information collected from one or more of the sensors and employ acoustic field inversion methods, so that the SSD data is used to image vast expanse of ocean in a short period of time. For example, at least some embodiment use a three step process that includes environmental modeling (e.g., via sensors) to help get accurate information about how energy propagates in the ocean or body of water being imaged; using information based on or derived from the environmental information to determine where some or all of the SSDs are in the body of water (e.g., via array shape determination/approximation, also known as path estimation, as described herein), and then using the environmental information and locations of the SSDs to help determine where targets are in the water. This is all explained further herein.

In the description that follows, references is made at times to elements that are named as modules, processing blocks, systems, servers, processors, etc., as well as various elements depicted in block diagram and/or flow diagram form. Those of skill in the art will appreciate that such elements can be implemented entirely in software, entirely in hardware, and in any combination of software and hardware. In addition, unless otherwise specifically listed, functions, processes, and actions provided by and/or occurring at the listed elements can, of course, be distributed over multiple software and/or hardware components.

Although SSDs can include many different types of devices, for exemplary and illustrative purposes, the embodiments and examples described herein are, for simplicity, explained using the example of a bobber.

Figure 2:
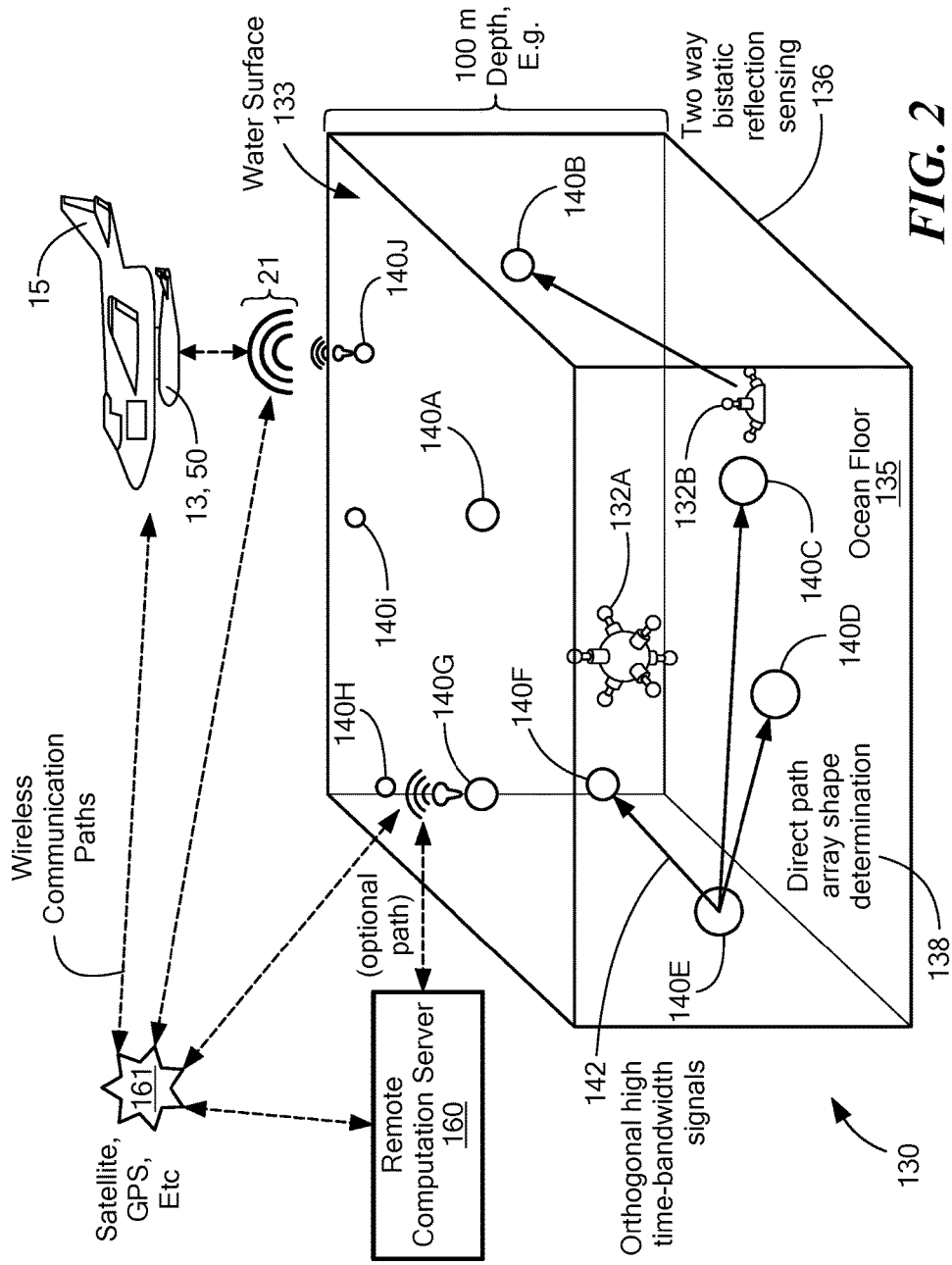
FIG. 2 depicts an illustrative bobber field and system showing a technical concept of an underwater environment in which at least one embodiment described herein is embodied.

FIG. 2 depicts an illustrative bobber field 130 and shows showing a technical concept of an underwater environment in which at least one embodiment described herein is embodied. As shown in FIG. 2, bobber field system 130 includes these primary types of components: one or more bobbers 140 (shown for illustrative purposes as a field of bobbers 140A through 140J, though the number of bobbers 140 shown is not limiting), a receiver 13 and computer system 50, a satellite with GPS 161, and a remote computation server 160, all in operable communication (e.g., wirelessly) via transmitted RF signals 21 (where the transmitted signal 21, as discussed further herein, include not only acoustic information 157 (see FIG. 7) but also GPS recording information 155 (see FIG. 7) and SVP bobber recording information 153 (FIG. 7), as discussed further herein.

Although the remote computation server 160 is illustrated as being located separately from the vehicle 15 (e.g., an airplane, UAV, drone, ship, etc.) that receives data from the bobbers 140, in at least some embodiments, the remote computation server 160 also can be part of the vehicle 15 and/or can even use some or all of the same components of the computer system 50 on the vehicle 15. In at least one embodiment, at last a portion of the remote computation server 160 is implemented as part of the bobber 140. Further, in at least one embodiment, the bobbers 140 may communicate directly with the remote computation server 160 via satellite 161 or other wireless communication system that is in operable communication with a receiver 13 that receives GPS signals 142 transmitted from the bobbers 140.

The field 130 of bobbers 140 can include any number of bobbers 140 desired, depending on the application. In an exemplary embodiment, anywhere from 20-200 bobbers 140 are dropped. An exemplary bobber in one embodiment is approximately a standard sonobuoy "A" size, but this is not limiting. In some embodiments, a bobber itself 140 can be considered a submersible sensing system that itself includes environmental sensors (e.g., sensors 132), acoustic detection sensors (e.g., the hydrophones 22, 28), and position sensors (e.g., the GPS transmitter 34 and antenna 36, position assist 26). As will be understood in the art, the density of bobbers 140 in the water (and, in some embodiments, even the arrangement) depends on the frequency used and on the types of objects being detected. For detecting objects at the greatest range, advantageously the bobber 140 is configured to listen for the lowest frequency sound waves, because the distance sound propagates in water is inversely proportional to the frequency of the sound wave, primarily because of lower absorption. However, another consideration is that the size and cost of deploying a plurality of bobbers 140 can be inversely proportional to the frequency of the sound waves being detected. Those of skill in the art will be able to determine appropriate tradeoffs between these conditions.

Figure 3:
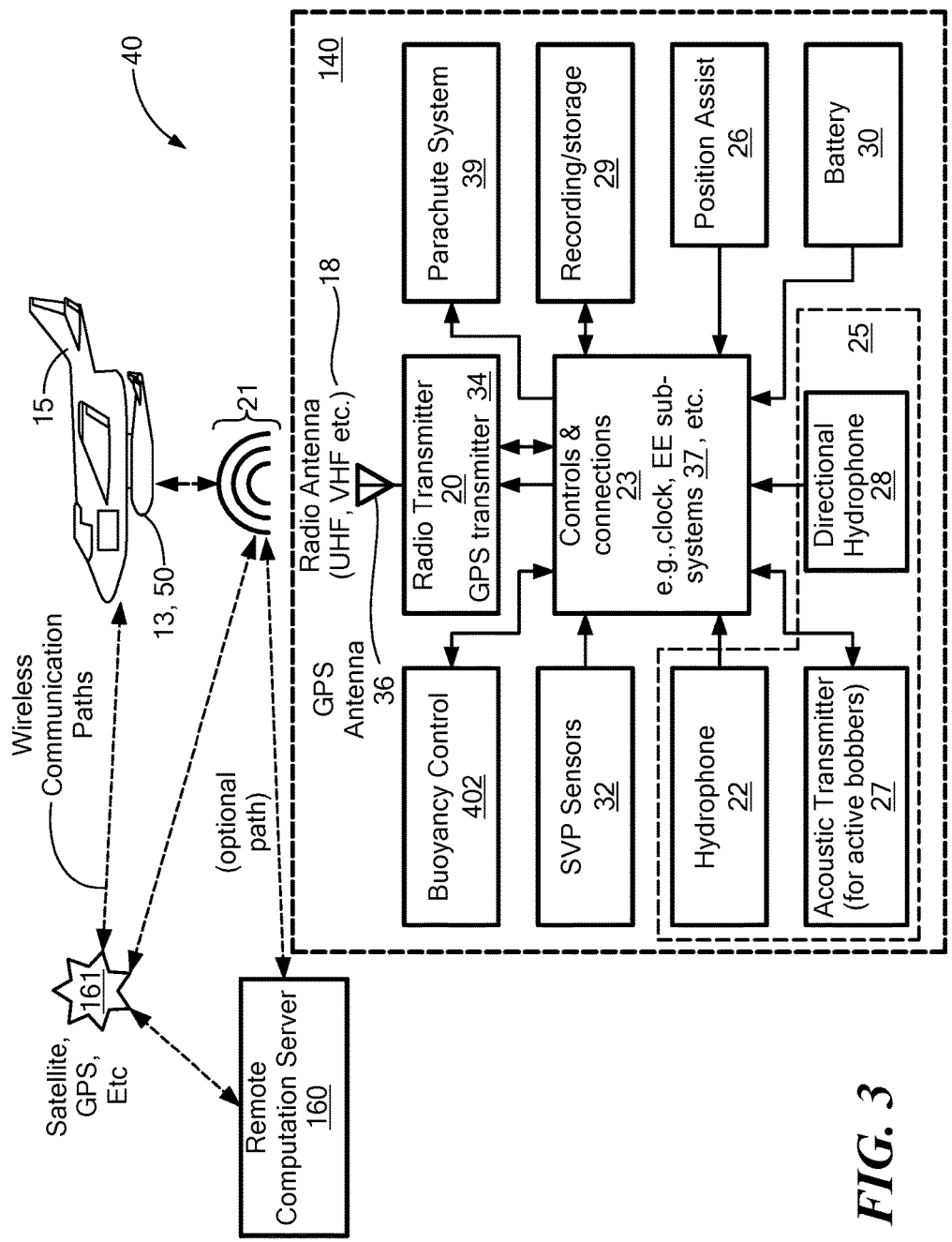
FIG. 3 is an illustrative block diagram of a submergible sensor device (SSD)/bobber system in accordance with at least some disclosed embodiments.
Figure 4A:
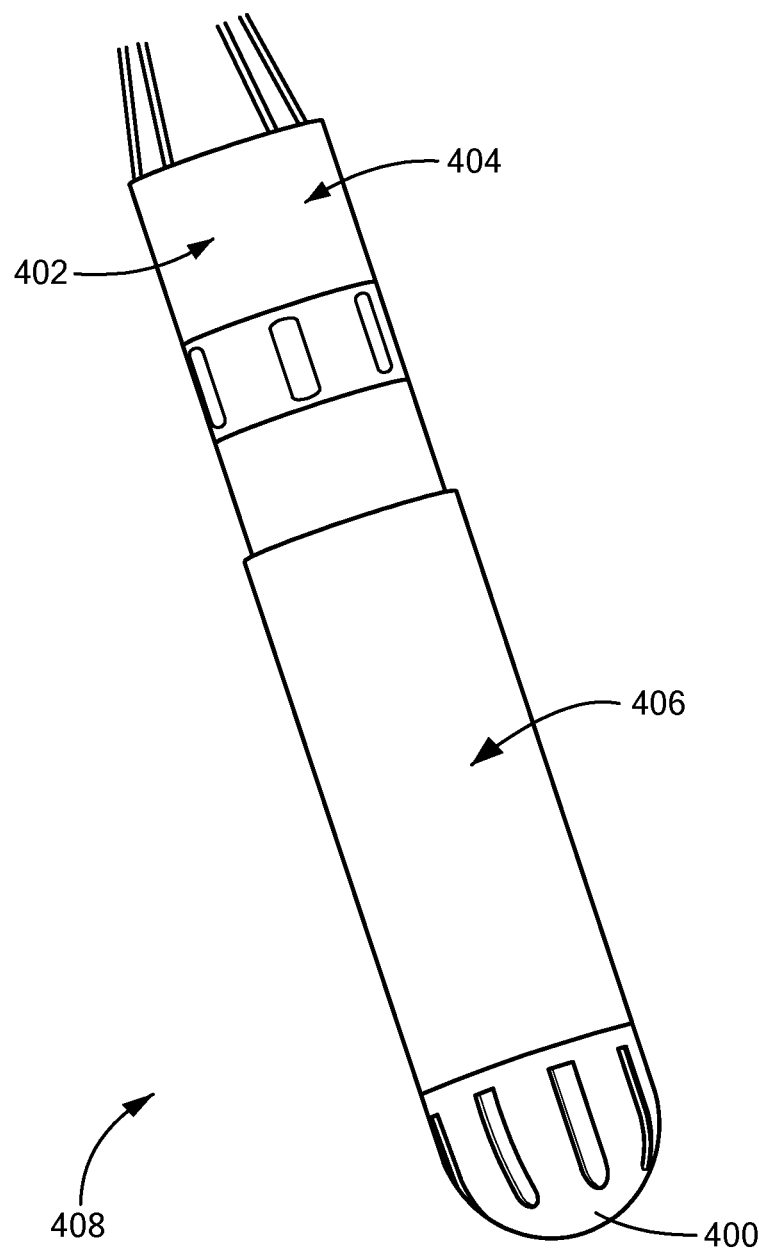
FIGS. 4A-4B are exterior (FIG. 4A) and interior (FIG. 4B) vies of an illustrative example of bobbers with controlled buoyancy that are provided in accordance with at least some embodiments described herein.

FIG. 3 illustrates a functional block diagram 40 of a portion of the bobber system 130 of FIG. 2, in accordance with one embodiment, and FIGS. 4A-4A provide illustrative examples of some bobbers implemented and/or usable with at least some embodiments of the system of FIG. 130. These are discussed further herein. In addition, FIGS. 7-9, described further herein, provide functional block diagrams of portions of the remote computation server 160, and FIG. 10, described further herein, is a block diagram of an exemplary computer system 50 usable in connection with the bobber system 130 of FIGS. 2 and 3 and which also is usable, in one embodiment, as part of the remote computation server 160.

Referring again to FIGS. 2 and 3, at least a portion of the bobbers 140 are configured to record information (via recording/storage 29) that the bobbers 140 collect about objects 132 in the water, where the objects being detected can include, in one embodiment, any kind of object (fixed or moving) that can act as a coherent scatterer, or that has a major impedance difference as compared with water, such as a metal object, a large rock outcropping, etc., or anything that is capable of providing a signature to a sonar system, such as a fish. FIG. 2 shows these objects 132 to be mines (both floating and partially submerged), but this is not, of course, limiting. Note also that objects 132 to be detected could include moving objects, especially slower moving objects.

The bobbers 140 also are configured to record information, collected via one or more environmental sensors 32, about parameters and characteristics of the water that affect sound velocity, including but not limited to one or more of air temperature, salinity, water temperature, barometric pressure, wave height, electric fields, magnetic anomalies, and bioluminescence. The information is recorded, in one embodiment, along at least a portion of a path taken by the bobber 140 during a sink/float mission (this is described further herein in connection with FIGS. 5 and 6).

As FIG. 2 illustrates and as will be further described herein, some of the bobbers 140 are disposed on the water surface 133, some are disposed on or near the ocean floor 135, and still others are disposed somewhere within the depths of the water (which is shown for illustrative purposes in FIG. 2 as being about 100 meters). This is illustrative, of course, and provided to show possible locations of bobbers 140 before, during, and after a sink/float excursion.

In FIG. 2, although the receiver 13 and processor 50 are shown as being disposed on a remote aircraft 15, and the remote processing server 160 is depicted as being disposed elsewhere, none of this is intended as limiting. In at least some embodiments, any, all, or some of the receiver 13, processor 50, and remote computation server 160 can be disposed together or separately, on a helicopter, Unmanned Aerial Vehicle (UAV), drone, sea vessel, land-based location, or as part of any vehicle(s), device(s), apparatus(es), system(s), or location(s) that is/are capable of receiving and processing the received GPS and other information 142. Further, any or all of the receiver, 13, processor 50, and remote computation server 160 can be implemented using components spread over multiple locations and components, including the bobber itself 140, as will be appreciated. Although the receiver 13 and processor 50 are illustrated in FIGS. 2 and 3 as being co-located, this is not limiting. Further, in at least some embodiments, the processor 50 has minimal analysis functions, and a human user or operator interprets at least some of the information received from one or more of the bobbers 140, with or without additional information provided by the remote computation server 160.

Referring briefly to FIG. 3, an exemplary embodiment of a bobber 140 includes some components or subsystems that are similar to the prior art sonobuoy 10 of FIG. 1, such as the hydrophones 22, 28, the seawater battery 30, a multiplexer 24 (contained within the electrical controls and connections 23). In addition, the bobber 140 includes, in one embodiment, a position assist module 26, which was not part of the prior art sonobuoy 10, where the position assist module, in at least one embodiment, includes one or more devices (not shown) to assist in measuring position, such one or more accelerometers and/or one or more gyroscopes, as will be understood is the art. The hydrophone can be any device capable of detecting acoustic signals under water, especially in the frequencies of interest, as will be understood, such as a device that includes=a multichannel directional piezoelectric ceramic transducer. As will be understood, many different types of hydrophones are usable in the embodiments of the invention.

The exemplary bobber 140 also includes subsystems not shown as a combination in the prior art sonobuoy 10, such as a GPS 34 and GPS antenna 36 (or any other subsystem capable of sensing position as a function of time), one or more environmental sensors 32 (such as SVP sensors 32), an acoustic subsystem 25 (which includes the hydrophones 22, 28 as well as, if the bobber 140 is active, an acoustic transmitter 27), electronics 23, such as a clock, as well as a buoyancy control mechanism 38.

The acoustic transmitter 27 is configured to be able to generate an orthogonal high time-bandwidth signal in accordance with a communications scheme that is capable of providing multiple separate and distinguishable waveforms in a given frequency band or sonobuoy channel, such as a code division multiple access (CDMA) technique or a frequency modulation (FM) sweep technique. In some embodiments, the acoustic transmitter 27 provided together with a corresponding acoustic receiver (hydrophone 22), provided as a transducer, and in some embodiments the acoustic transmitter 27 is provided as a separate component from the acoustic receiver/hydrophone 22.

The environmental sensors 32, in at least some embodiments, include sensors that measure one or more parameters that are usable to help determine SVP and/or the speed of sound in water, either directly or by calculations based on temperature, salinity, and other various modalities as discussed herein. For example, in one embodiment, sound speed is taken as a direct measurement with an ultrasound transducer. During operation, the bobbers 140, in one embodiment, are configured in a predetermined array formation, such that, at a predetermined time or upon a predetermined commend or condition, s the bobbers 140 will provide active transmissions and also gather acoustic information from the echoes received back from the active transmissions. This is all described further herein. The bobber 140 can be implemented using a standard buoy or even using a dropsonde, having several subsystems, as will be appreciated.

Figure 4B:
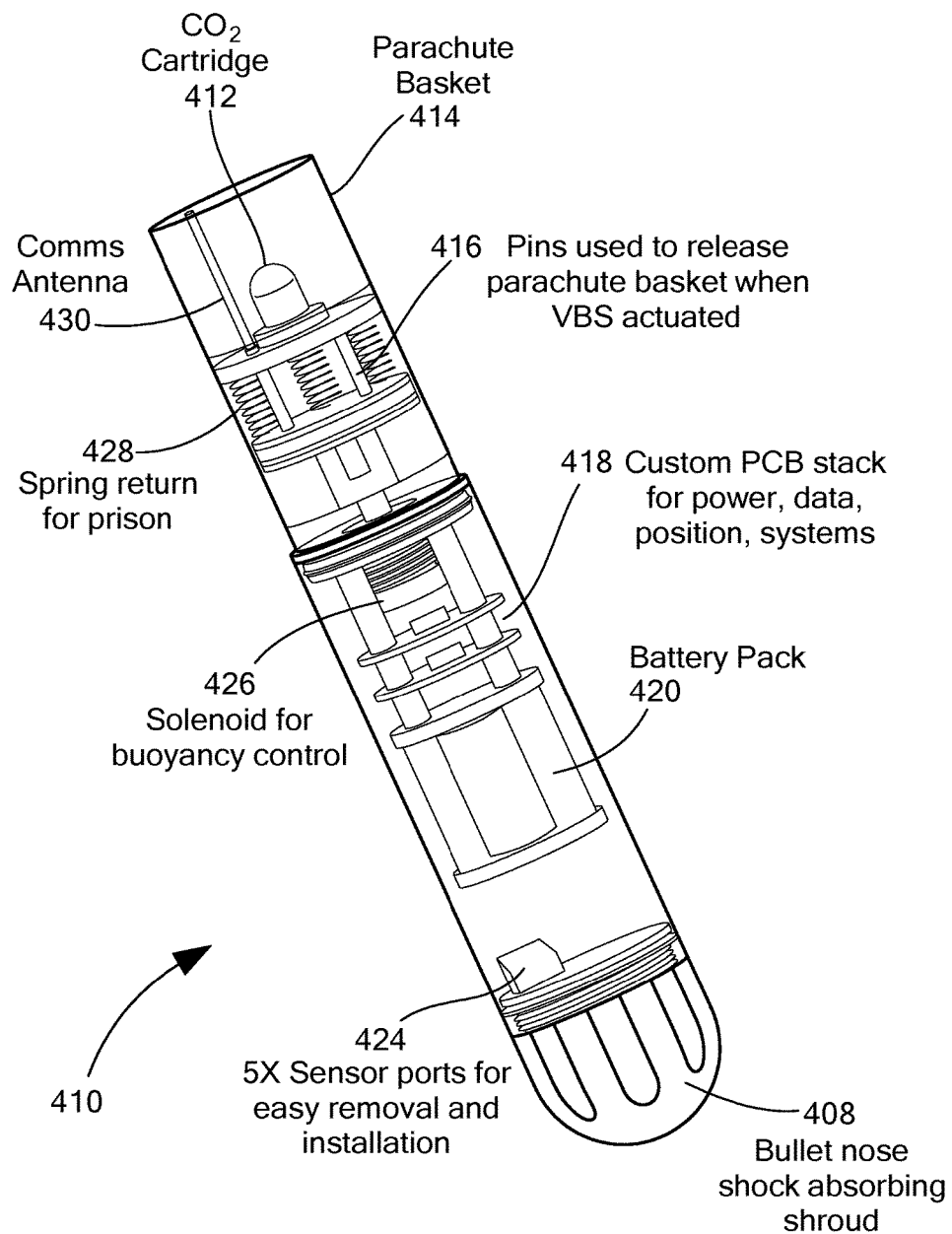

FIGS. 4A-4B are illustrative views of bobbers with controlled buoyancy that are provided in accordance with at least some embodiments described herein. For example, FIGS. 4A-4B are external 400 (FIG. 4A) and cut-away internal 410 (FIG. 4B) views of an embodiment of a bobber 140 design having primary components that include a buoyancy control system 402, a main EE (electrical engineering) pressure vessel 406, and a "bullet nose" shaped shroud 408. The buoyancy control system 402 can include, in one embodiment, an expandable air bladder that can be used to help change buoyancy. Other methods of changing buoyancy are, of course, usable in various embodiments. In one exemplary embodiment, the bobber 140 also includes a parachute basket 414 disposed within the parachute compartment portion 404. The parachute basket 414 contains a parachute that is used, in at least some embodiment, to help control the "fall" of the bobber 140 into the water, as will be understood in the art (e.g., to slow down the velocity of the bobber 140 by providing a controlled descent to the surface of the water and helping ensure that it impacts the water in an appropriate orientation). Note that controlling the fall of the bobber 140, such as via a parachute basket, is not required in at least some embodiments.

In addition, the bobber 140, in some embodiments, includes a carbon dioxide ($CO_2$) cartridge 412, that, when punctured or otherwise opened, releases $CO_2$ as part of the variable buoyancy system VBS. For example, in one embodiment, one or more pins 416 are used to release the parachute basket when the variable buoyancy system (VBS) is activated. Generally, the parachute compartment 404 is used as part of the VBS. A solenoid 426 is provided for buoyancy control, e.g., by operating an internal pump or valve (not shown); such buoyancy control is understood in the art, e.g., as shown in U.S. Pat. No. 3,818,523, which is hereby incorporated by reference.

A communications antenna 430 also is illustrated as positioned within the parachute basket 414, although the communications antenna 430 is not part of the buoyancy control system 38. The communications antenna 320, in one embodiment, generally transmits when it is above water. Advantageously, the communications antenna 430, in one embodiment, includes both a radio antenna 18 and a GPS antenna 36 (FIG. 3). A carbon dioxide cartridge 412 also is disposed within the parachute compartment 404 portion. The bobber also includes one or more pins used to release the parachute basket 414, a main EE pressure vessel 406, and a bullet nose 400 for sensor protection. Note that the other components shown in FIG. 3 can be provided in the embodiments of FIG. 4A-4B, but are not all visible in this embodiment.

The bobbers 140 are deployed via any method known in the art, such as dropped from a ship, dropped from a plane such as plane 15 (or a different plane), launched from another seagoing or air vehicle (e.g., an air or sea drone), dropped from a UAV, or any other known method. In at least some embodiments, the bobbers 140 are deployed or dropped in a predetermined pattern. The bobbers 140 are, in one embodiment, GPS enabled to know their exact location whenever they are surfaced and/or are able to be in communication with the GPS satellite 161. In one embodiment, the bobbers 140 are configured to have a sink rate of approximately one meter per second when disposed in 100 meters of water, but this is illustrative and not limiting.

Figure 5:
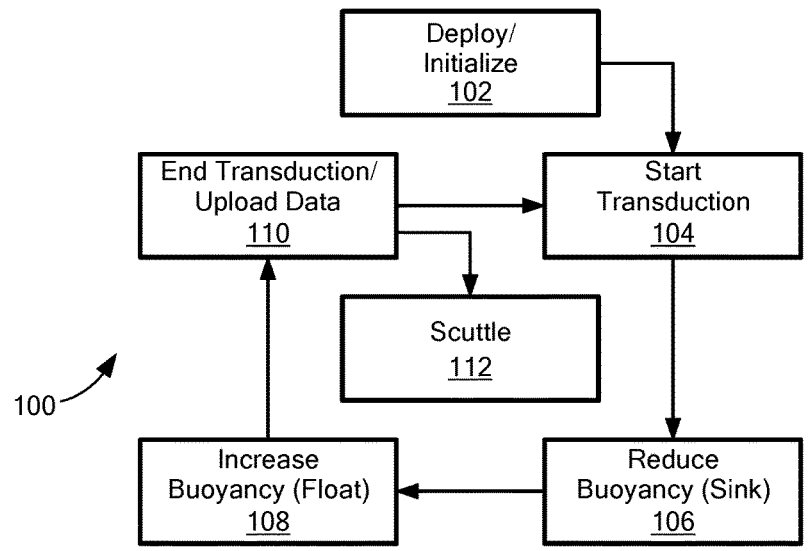
FIG. 5 is a flow diagram showing high level operational functions of the bobber system, in accordance with at least one embodiment.
Figure 6:
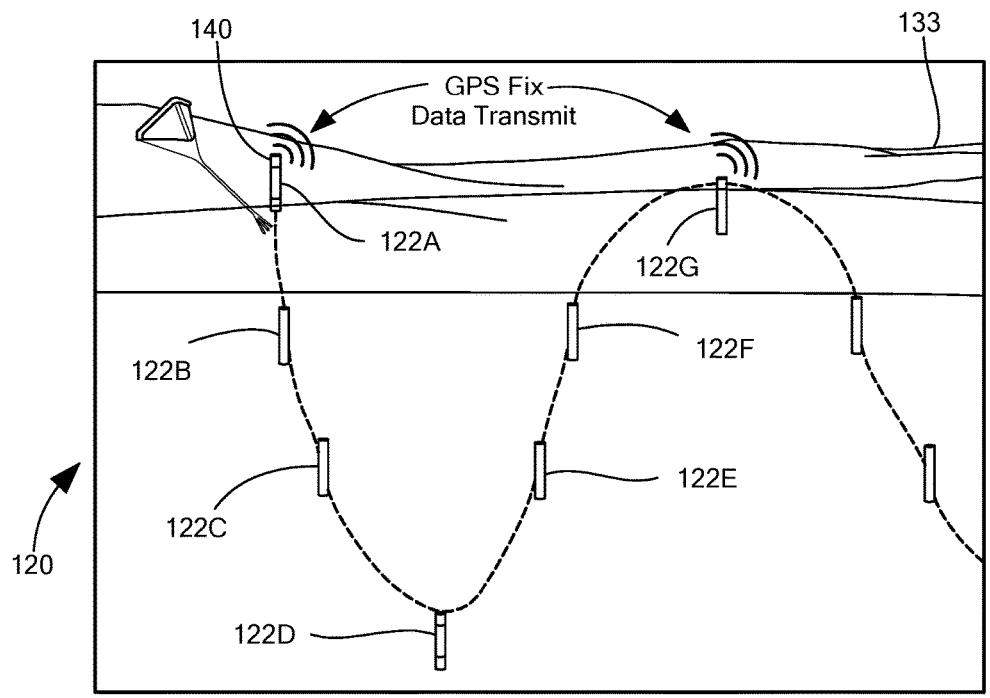
FIG. 6 is an illustrative view showing motion of an exemplary bobber during an sink/float excursion, in accordance with one embodiment.

The bobbers 140 are configured to record information from the sensors 32 and acoustic information during at least a portion of one or more sink/float excursions taking place in the water. For example, FIG. 5 is a flow diagram 100 showing high level operational functions of the bobber system before, during, and after a sink/float excursion and FIG. 6 is an illustrative view 120 showing motion of an exemplary bobber 140 during a sink/float excursion, in accordance with one embodiment. Referring to FIGS. 2-6, prior to the sink/float excursion, in some embodiments, each bobber 140 includes a clock (that is part of electrical controls and connections 23), and the clocks of at least some of the bobbers are synchronized prior to deployment (block 102). In at least some embodiments, the clock is disciplined by one or more GPS signals, such that, as long as the bobber 140 is on the surface 133, its clock can be synchronized to a GPA clock. Then, at the start of a sink/float excursion, the bobber 140 is deployed (e.g., by being dropped or launched into the water, optionally in a predetermined pattern) (block 102), and the bobber 140 is initialized once it reaches start position 122A. For example, in one embodiment, the bobber 140 includes one or more contact sensors (not shown, but well understood in the art) that detect when the bobber 140 contacts the water. Advantageously, in one embodiment, the battery 30 is active on or before the bobber 140 contact the water, so that the circuitry on the bobber 140 is able to receive waveform instructions, e.g., from computer 50. In one embodiment, the GPS transmitter 34 and antenna 36 are active whenever the bobber 140 is receiving power.

As part of initialization, when the bobber 140 is at the surface of the water (starting point 122$a$), the bobber 140 uses its GPS antenna 36 determine and record initial position information about its starting location 122A. For example, in one embodiment, a bobber 140 with an onboard clock may be under control of one or more GPS signal while on the water surface 133. Optionally, in one embodiment, the bobber 140 uses its radio antenna 18 to communicate position information to the sonobuoy receiver 13 and/or the remote computation server 160. The bobber 140, in one embodiment, records position information at any desired times as needed during a given sink/float mission, such as while on the surface 133, prior to the sink/float excursion, at one or more times during the sink/float excursion, at the end of the sink/float excursion, etc. In one embodiment, the bobber 140 records position information at substantially the same time that it is receiving and/or recording acoustic data and/or environmental data. In one embodiment, the bobber 130 records its position information while on the surface, but does not upload until some or all of the sink/float excursion (or mission) is completed. Advantageously, in one embodiment, the position information and acoustic information (e.g., from the excursion), together with information detected by environmental sensors, are used during the process of mapping the area of water, as described further herein.

Referring again to FIGS. 5-6, after initialization (block 102), transduction (the data gathering period) (block 104) begins. In at least some embodiments, at least some of the bobbers 140 have a globally scheduled time to start transduction and enable the transducers 22 and/or 28 to start pinging and/or recording (block 104). In at least some embodiments, all bobbers 140 both ping and record. For example, pinging and recording occurs, in at least some embodiments, even before sinking/descending (block 106) begins, and continues through at least a portion of the sinking and ascending. In addition, for at least some embodiments, at least a portion of the bobbers 140 have an individually scheduled time to reduce buoyancy and begin descent (block 106), according to a pre-determined deployment schedule. The bobber 140, in one embodiment, follows a path from 122A through 122D, during which it reduces buoyancy (block 106), to effect vertical displacement (i.e., sinking) in the water. The bobber 140 also covers horizontal and vertical distance by using currents in the water. As the bobber 140 sinks to depth 122D, during transduction, its sensors 32 are acquiring and it is recording information about sea characteristics and/or parameters. In addition, during transduction, the bobbers will take certain actions depending on whether or not they are configured to operate as passive detection devices or as active devices that transmit signals.

Advantageously, the bobbers 140 are configured to transduce and record acoustic signals during a sink/float excursion (described further herein), where some bobbers (e.g., the bobbers labeled as 140G and 140J in FIG. 2) stay at the surface 133 for GPS geo-registration, and some bobbers 140 (e.g., the bobbers labeled 140C and 140D in FIG. 2) sink to the bottom 135 for bottom registration. For example, in one embodiment, during transduction (blocks 104-110), as well as during ascent and descent, for bobbers 140 configured to operate as active bobber, the active bobbers 140 transmit orthogonal high time-bandwidth signals. In one embodiment, the active bobbers 140 are sending out these orthogonal high time-bandwidth signals at a substantially continuous ping rate of about 2 seconds (with hundreds of pings per bobber 140 sent out every 2 seconds). Each bobber 140 that is actively transmitting, is transmitting a waveform that can be differentiated from the waveforms sent by the other actively transmitting bobbers 140. In particular, in one embodiment, each transmitting bobber 140 transmits a waveform encoded with a code division multiple access (CDMA) type of waveform.

During transduction (blocks 104-110), for bobbers 140 configured to operate as passive detection devices, one or both of the hydrophones 22 and 28 of these bobbers 140 detect acoustic sounds and/or echoes/returns (if any) in the water and record that information (e.g., via recording/storage 29). In particular, as shown in FIG. 2, the bobbers 140 use two-way bi-static reflection sensing to detect acoustic signals that are then recorded. The detected acoustic signals, in one embodiment, have both monostatic and bi-static reflected returns in them. For example, the bobbers 140 configured as passive detection devices can detect returns objects in the water, from objects that emit their own signals, and also echoes from the orthogonal high-time bandwidth signals 142 that are transmitted by the acoustic transmitter 27. Two-way bistatic reflection sensing, in the context of FIGS. 2-6, means that, in at least one embodiment, each bobber 140 also can acts as a passive bistatic sonar system, where the hydrophone 22, 28 (or other acoustic receiver on the bobber 140) collects acoustic returns directly emitted by a target as well as the echoes of signals sent by the transmitter 27 that have bounced of off objects. The signals can then be combined, e.g., at the remote processing server 160, to image the object.

In at least one embodiment, a given bobber 140 (e.g., an active bobber 140) not only transmits the orthogonal high-time bandwidth signal, but also detects and records acoustic returns. Because the signals are orthogonal high time-bandwidth signals, the waveforms transmitted will not interfere with each other and are separable from one another. In one embodiment, a direct path between at least a portion of the bobbers 140 is used for array shape approximation.

As is known, array shape approximation is a type of signal processing algorithm, where, in the situation of the array 130 of bobbers 140 as described in one embodiment herein, one can:

(a) determine where all the bobbers 140 are in the water at given times (where this determinations is based not only on the time stamping of data from the GPS information, but also, in some embodiments, on information and "error terms" relating to salinity, currents, clock drift, and SVP differences, as explained further herein);

(b) record all the direct path information from one bobber to the next, advantageously in time-stamped format;

(c) use triangulation (e.g., during post-processing in the remote computation server 160) to better localize where each bobber 140 was during each transmission;

(d) use at least a portion of the sound velocity data (e.g., data recorded by sensors 132 and uploaded, whether dynamically during the sink/float excursion or known in advance through other means) to seed a propagation model (model of sound velocity in the water), for that given volume of water covered by the particular array 130 of bobbers 140 that have provided the data;

(e) use time difference of arrival processing, at the remote computation server 160, to determine where each bobber 140 is relative to at least a portion of the other bobbers 140 (which processing can, in at least one embodiment, take into account drift and SVP differences based at least in part on the propagation model, where the acoustic information helps in the derivation of the position of the bobbers 140 relative to each other); and (f) use information relating to monostatic and bi-static configurations and back-propagation of energy (i.e., echoes), along with the determined information in (e) to determine where bobbers 140 were in the water during each data collection, including where they were relative to each other, to better detect and help to characterize more accurately the coherent scatterers (i.e., targets, objects, etc.) in the given volume of water that is covered by the array of bobbers 140.

Knowing the orientation of the bobbers relative to each other at different points in time, combined with the recorded acoustic data, as well as information from some or all of the sensors (especially information relating to determination of SVP), helps in the creation of a set of data that can be processed into an "image" of a volume or region of water. This "image" can then be inverted/reversed (e.g., like a photographic negative) to better show the locations of objects 132 in that volume of water. That is, in at least one embodiment, the image resulting from the data not only provides all the substantially exact locations of all the bobbers 140, along with the detected reflections, such an image can, when inverted, actually show an image corresponding to an effective a map of all objects or targets in a vicinity. In addition, in one embodiment, at least a portion of the active bobbers 140 are configured such that they can overlap in interrogation radius without interfering with each other, and/or have a direct path right between the bobbers, and these features provides additional advantages in detection.

As explained further herein, regarding inverting the field, the combination of the oceanographic data that the bobbers 140 record (including but not limited to SVP at the various depths at each the bobber 140 ascends and descends) depth of the water, and the acoustic information that the bobbers 140 record enables a determination of, effectively, nearly everything that is in a given volume of water, potentially (given enough bobbers 140), the entire ocean, and how the ocean is filled. By determining how the sound propagates in the ocean, and, from that, where the bobbers 140 are in the ocean, and, from that where everything else is (or what everything else is) in the ocean, to within some size and strength (determined by the frequency that they are working with), at least some embodiments described herein enable improvements over known sonobuoy systems.

As noted above, the direct path between bobbers enables additional types of processing to occur after the data is uploaded to the remote computation server 160. For example, use of array shape approximation helps to permit migration to occur (e.g., Kirchoff migration, though this is not limiting. Those of skill in the art will appreciate that other techniques are usable). In contrast, in prior art systems, sonobuoys that are not transmitting orthogonal high time-bandwidth signals generally need to be spaced far enough apart so that the sonobuoys do not interfere with each other. This means that the acoustic returns that they process might not be as precise as those provided in at least some embodiments herein, nor will they be able to provide as many potential views of a given target or object 132 (which can either result in a target 132 being missed altogether, or the mapping of it being less precise or complete as compared to the embodiments described herein).

In contrast, by using the orthogonal high time-bandwidth signals described herein, the configuration 130 can have the bobbers 140 much closer to each other, enabling better accuracy and coverage of the water. For example, in one embodiment, for a frequency of about 30 kHz (the frequency of transmission of the orthogonal high time-bandwidth signal), the bobbers 140 are approximately 0.5 km apart. One of skill in the art will appreciate, however, that the spacing of the bobbers 140 in the water depends at least in part on the expected size of the object being detected, where the smaller the object, the closer together the bobbers 140 should be.

Furthermore, using orthogonal waveforms enable data to be processed with the unique knowledge of each waveform separately, as will be appreciated. Consider an example of four bobbers 140 as disposed in the water during transduction with at least one presently described embodiment.

Because of the direct paths between bobbers 140, the multi-static arrangement, and the two-way bi-static reflection sensing, the four bobbers 140 can, for example, map the same object in the water sixteen different ways (e.g., each bobber 140 can detect not only its own return, but also the returns from the other three bobbers). This also allows the process to detect information at more incidence angles and more bistatic paths, as well as monostatic paths.

In addition, during transduction (blocks 104-110), in one embodiment, sensors 132 on the bobbers are collecting information usable to help determine SVP, including during times when the bobber is ascending and descending. It also should be noted that not all of the bobbers 140 that are deployed necessarily will be participating in all sink/float excursions. For example, in one embodiment, some bobbers 140 remain surfaced for geo-registration. In one embodiment, some bobbers sink to the bottom surface of the body of water (e.g., ocean floor 135) for bottom registration.

In one embodiment, once a given bobber 140 reaches a predetermined maximum depth (or the maximum possible depth) or senses that it is close to the bottom, the buoyancy control subsystem 402 increases buoyancy until the bobber 140 begins its ascent and start floating (increasing buoyancy) (block 108) is at point 122D. In at least some embodiments, the decision to stop sinking and start floating corresponds to a predetermined condition being met, such as reaching a predetermined depth or location, reaching a predetermined ocean condition (e.g., water temperature, salinity, pressure, etc.), after a predetermined time period, etc., as will be understood in the art. As the bobber 140 begins its ascent (block 108), it travels from 122D to 122G, still listening and recording information as it moves. At point 122G, when the bobber reaches the surface (or any point sufficiently close, such that the radio antenna 18 is able to transmit), it stops its ascent, and begins to upload data (block 110) to the receiver 13, via the radio antenna 18. At the time the sonobuoy uploads data, in one embodiment, there is also a GPS registration, which helps to determine the drift or movement of the bobber from the last time of GPS registration (e.g., the difference, GPS-wise, between point 122A and 122G.)

Figure 7:
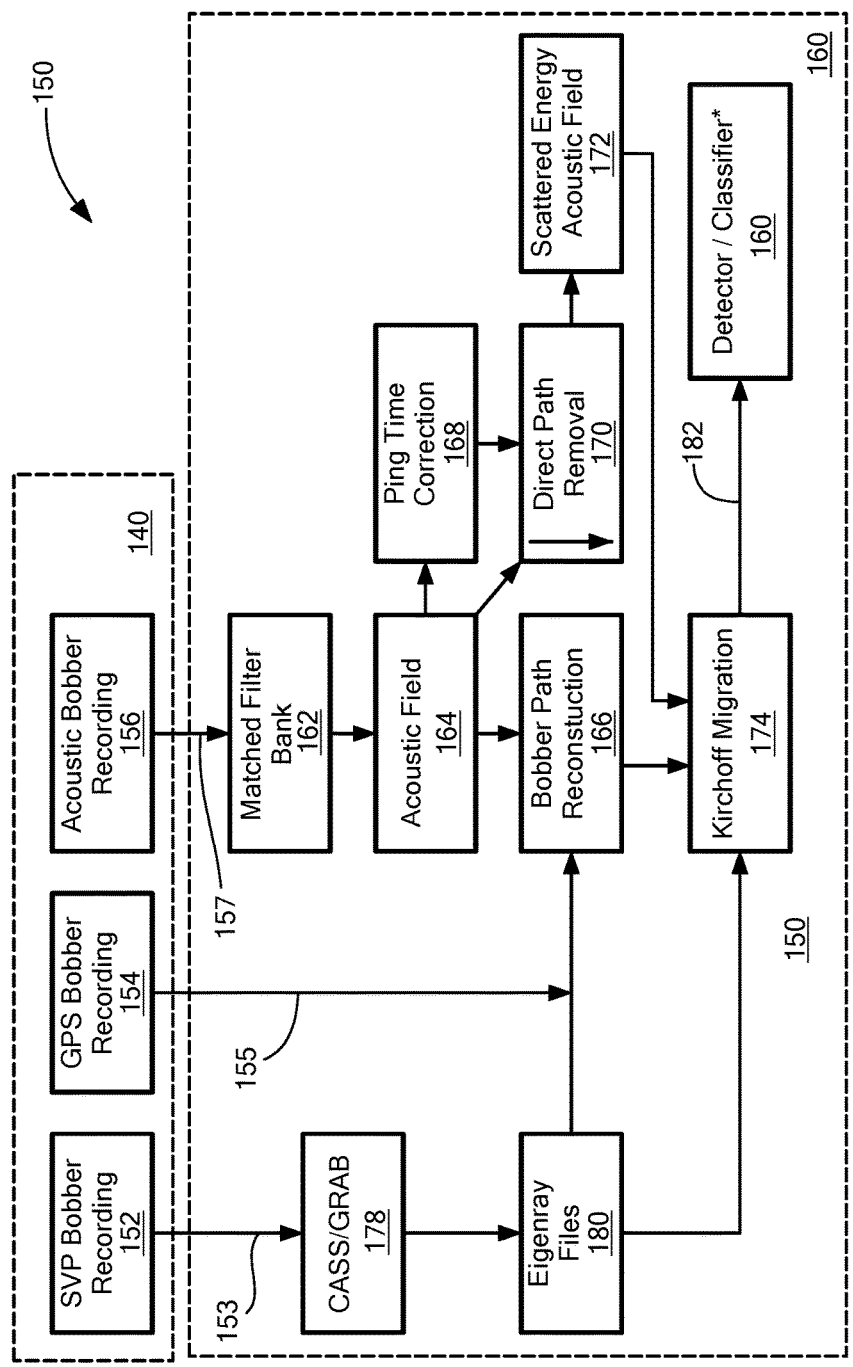
FIG. 7 is an exemplary block diagram showing an illustrative top level architecture of a bobber field detection classification location (BFDCL) system, in which at least one embodiment disclosed herein is embodied.

At the end of a given transduction cycle (block 110), the bobbers 140 that have been recording information (both echoes and/or sensor data) transmit the data that they capture to the receiver 13 using the radio transmitter 20, antenna 18, over one or more channels (e.g., the aforementioned mobile maritime channels, if applicable). The data that is captured and stored is transmitted as part of the transmitted information 21 (FIGS. 2 and 3) which can include, in at least some embodiments, information that the bobber 140 records related to SVP 153 (FIG. 7), related to GPS data 155 (FIG. 7) and related to acoustic returns 157 (FIG. 7). In one embodiment, this transmission of data is done after each descend/ascend cycle. In one embodiment, this transmission of data is done after more than one descend/ascend cycle (in which case, referring to FIG. 5, instead of scuttling (block 112) the bobber 140 goes to block 104 to start transduction). In one embodiment, the bobber 140 continues transduction cycles until a predetermined condition is reached, such as a predetermined time, a predetermined number of cycles, a predetermined type or amount of data received, if a predetermined type of data is detected, if a predetermined amount of the body of water covered, etc. The determination that a predetermined condition is met can, in one embodiment, be determined "on the fly" based on the actual data received and uploaded. Further, depending on the application and desired information, a bobber 140, in one embodiment, operates during just a single transduction cycle.

At the surface 133 (or at least at a known point at which it is able to communicate with the receiver 13 and with the GPS 151), the bobber 140 transmits the stops its ascent and uploads (block 110) the recorded data (which advantageously is time and/or location stamped data) to either or both of the sonobuoy receiver 13 and the remote computation server 160. In one embodiment, the data is uploaded to the remote computation server 160 via radio.

The remote computation server 160, after receiving the data, uses at least a portion of the information (e.g., some or all of the sound velocity data) to provide information to a model of the propagation of sound in the water, then uses this information to help adjust the position and/or acoustic return information provided in the acoustic returns, to help create a picture of what is in a given volume of water. In one embodiment, determining and adjusting position is a two-step process. The first step of the process is, for each bobber 140, using the recorded information to determine, to a substantially accurate degree a time-dependent picture of where each respective bobber 140 is in under the water, throughout the sink/float excursion 100 and then combining all the information from all the bobbers 140 to get a time dependent picture of what the array 130 looks like. The next step is, once bobber 140 locations are known, beam-form all the acoustic returns from all the bobbers 140, to look for patterns or other information indicating that an object is in the water. More details about the processing that occurs when the uploaded data is received is discussed further herein, in connection with FIGS. 7-9. In addition, FIG. 10 is an exemplary block diagram of a computing device usable for some or all of the remote processing server 160. This is discussed further herein.

FIG. 7 is an exemplary block diagram showing an illustrative top level architecture 150 of a bobber field detection classification location (BFDCL) system 150, in which at least one embodiment disclosed herein is embodied. The architecture 160 in particular details some of the functional and processing blocks at the remote computation server 160 (which has functions that are shown in greater detail in this figure via the dotted line in FIG. 7.). Referring briefly to FIGS. 2-6 and 7, the remote computation server 160 receives information uploaded from one or more of the bobbers 140, including an SVP Bobber Recording 152, a GPS Bobber Recording 154, and an Acoustic Bobber recording 156. Some or all of this information is contained in one or more transmissions sent from the bobber 140 via the radio antenna 18 to the receiver 13. The SVP Bobber Recording 152 includes information recorded by the sensors 132. The GPS bobber recording 154 includes stored/recorded GPS position information taken at the start and end of a sink/float excursion 120. The Acoustic bobber recording 156 includes acoustic information that was information recorded via the one or more hydrophones 22, 28, as described herein.

In one embodiment, the architecture 150 includes information or data from an Eigenray propagation model 178, which for illustrative purposes only is shown herein to be the Comprehensive Acoustic System Simulation (CASS) with the Gaussian Ray Bundle (GRAB) (CASS/GRAB) 178 Eigenray propagation model. (Other Eigenray propagation models and other environmental models of the ocean also are usable, as will be appreciated by those of skill in the art). As is understood in the art, the CASS/GRAB model 178 is an active and passive range dependent propagation, reverberation, noise and signal excess model that is in the process, as of this writing, of adopted as a Navy standard (see, e.g., U.S. Pat. Nos. 6,519,547 and 7,187,619, which reference and use the CASS/GRAB model, which patents are hereby incorporated by reference). The CASS/GRAB model 178 can be used, in one embodiment, as part of an environmental model for the BFDCL top level architecture 150, making use of SVP information 153 that is uploaded based on (or derived from) the SVP bobber recording 152, to generate a set of Eigenray files 180.

Referring again to FIG. 7, the uploaded acoustic information 157 that is based on (or derived from) the acoustic bobber recording(s) 156 are provided to a matched filter bank 162 which takes advantage of high time-bandwidth products (i.e., the aforementioned orthogonal high-time bandwidth signals that allow the bobbers 140 to acoustically overlap without interference. In one embodiment, the matched filter bank 162 consists of one filter per bobber 140, with each respective filter configured to be responsive to the particular waveform a given bobber 140 transmits. Thus, the matched filter bank 162 receives the uploaded acoustic signal 157, which itself includes acoustic return information from a plurality of bobbers 140. The matched filter bank 162 is configured to split the uploaded acoustic signal 157 into a plurality of sub-parts that correspond to each of the bobbers 140 whose information was part of the uploaded acoustic signal 157. Doing this separates the acoustic field 164 (that was recorded) into the parts that were generated by each of the bobbers 140 and helps to remove at least some of the interference. This results in an acoustic field 164 that is used by some or mall of the other processing modules, before Kirchoff migration 174.

Referring again to FIG. 7, in one embodiment, at least a portion of the information about the acoustic field 164 is provided to an optional ping time correction module 168 and/or an optional direct path removal module 170, before the scattered energy acoustic field 172 is generated. The Ping time correction module 168 uses reciprocal paths to make sure that the recorded acoustic information is accurate. The ping time correction module 168 can determine this, because, in one embodiment, this module has information about the tangible and measurable ways that the clock that is onboard each bobber 140 is drilling. In one embodiment, ping time correction is not only correcting for clock drift, but also corrects for at least some of the inaccuracies when each bobber 140 is transmitting pings during transduction. In particular, to invert the acoustic field properly, it is necessary, in one embodiment, to know exactly when each ping occurred in each bobber 140. Depending on how accurate the clock is that is used with a given bobber 140, ping time correction 168 might not be needed (e.g., if an accurate clock is being used).

The acoustic field information 164 and/or the output of the ping time correction module 168 are provided, in one embodiment, to an optional direct path removal module 170. The direct path removal module 170 is an optional module that helps to further clean up the acoustic signals. Signals returned along the direct path between the bobbers 140 (see FIG. 2) can be, in some instances, much "louder" acoustically than the scattering paths (i.e., paths not directly between the bobbers 140). Thus, in some embodiments, the direct path removal module 170 filters out at least a portion of the direct path signals (e.g., signals that are above a predetermined threshold), from either or both of the acoustic field 164 and the output of the ping time correction module 168. This helps to ensure that the resulting scattered energy acoustic field 172 is useful for helping to image the rest of the ocean.

Figure 8:
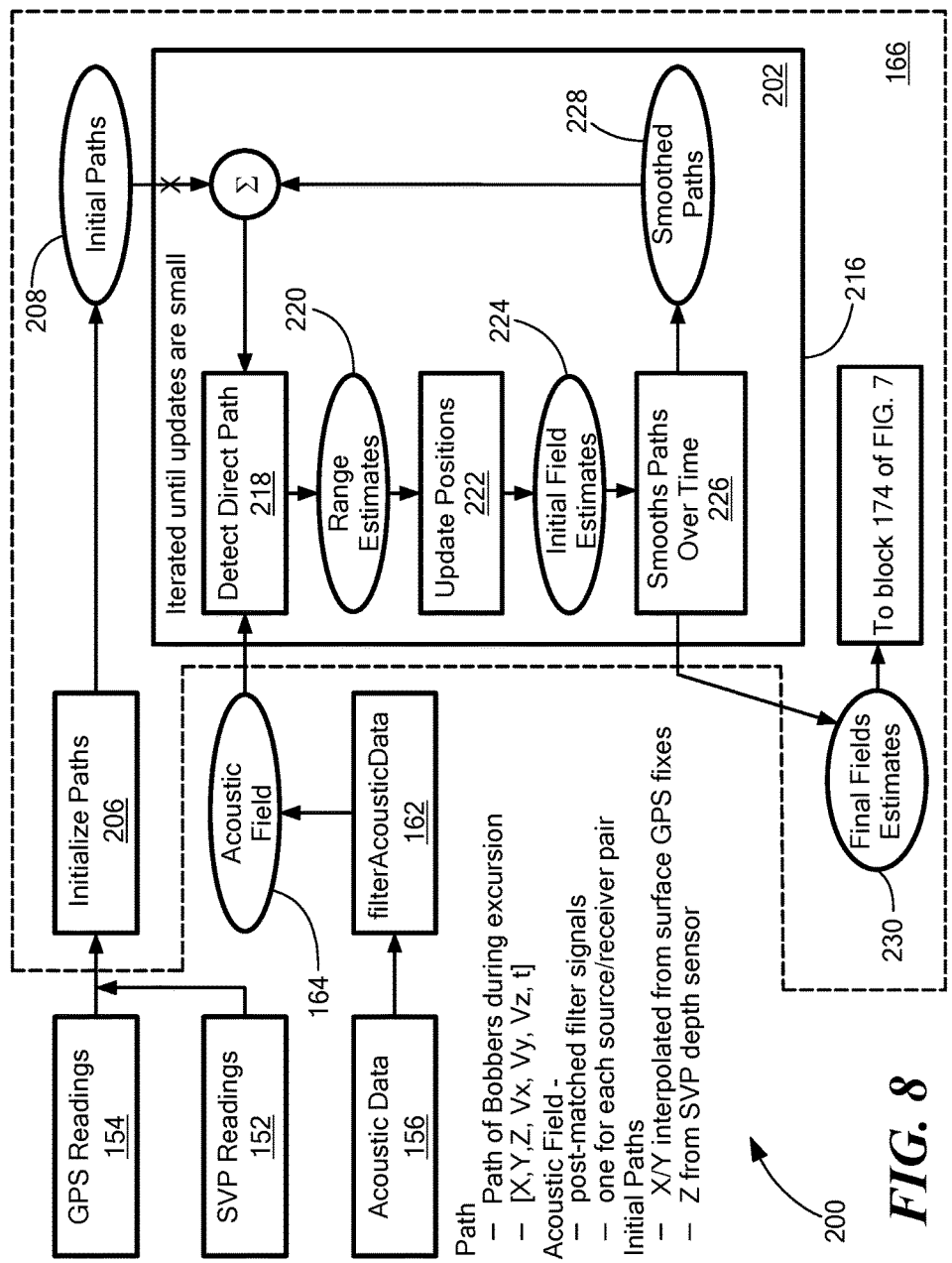
FIG. 8 is an exemplary path estimation block diagram for the BFDCL system of FIG. 7, accordance with at least one embodiment.

Referring again to FIG. 7, the Eigenray files 180 and acoustic field information 164 are provided to a bobber path reconstruction module 166. In one embodiment, the bobber path reconstruction module 166 implements a linearized iterated Kalman Filter type of algorithm which refines an initial estimate with range measurements formed between the Bobbers 140 each time a Bobber 140 ping occurs. The path estimation block diagram 200 of FIG. 8 illustrates, for one embodiment, the processes taking place in block 166 of FIG. 7. FIG. 8 is a path estimation block diagram in accordance with one embodiment.

Referring briefly to the block diagram 200 of FIG. 8, the algorithm/process of block 202 iteratively refines a "Bobber Field Estimate", which is a vector of estimated Bobber 140 locations (X/Y/Z) for all the Bobbers 140 in the field 130 at the time of each ping and the covariance of those estimates positions. The initial Bobber Field Estimate 224 is formed by utilizing the GPS fixes for each Bobber 140 (taken or derived from GPS readings/recordings 154) at times when the bobber 140 is on the surface 133 and interpolating between these fixes in X/Y when it is not. This initializes the paths (block 206) before further processing is done to generate the initial paths 208, which are provided to the detect direct path block 218 (and also later iteratively summed with the smoothed paths 228, as described further below).

In particular, the initialization of the paths uses the GPS readings/recordings 154 (i.e., initial X, Y, and Z coordinates as well as time stamp t) and the SVP readings/recordings 152 (i.e., information usable to determine velocity V at each coordinate, Vx, Vy, Vz), to generate an initial estimate of the paths (block 208) of the bobbers 140 during their respective sink/float excursions. When the bobber 140 is on the surface, the Z estimate is taken from the SVP depth measurements taken by sensors 132. When modeled data becomes available, the Z estimate may be refined by using acoustic detection of surface and bottom "flash".

Referring again to processes in block 202 of FIG. 8, the initial Bobber Field Estimate 224 is then updated (e.g., see block 202 steps) using ranges (e.g., range estimates 220) between Bobbers 140 as detected at every ping. The filtered acoustic field 164 also is provided to the detect direct path block 218. For each ping, from the initial FieldEstimate(s) 224 a range of samples, is selected where the expected direct path is to be found in each receiving Bobber 140 as well as an expected level for that path. In one initial implementation, isovelocity (the concept that sound is the same in all parts of a given column or sub-volume of water) is assumed. In another embodiment, based at least in part on information from a sound model such as the CASS/GRAB model 178 (or other models), the velocity of sound at different locations in the volume of water is adjusted based on information from the sound model. The sample of the direct path is identified, this is converted into a range (block 220), which is converted into a position (block 222) based at least in part upon the prior direction (i.e., detected direct path 218) between the source and the receiver.

The covariance for this "pseudoMeasurement" is then formed: it has a very narrow component along the direction of travel (the range resolution of the pulse), but very wide covariance along the two normal directions. In one embodiment, this is how the range measurement is linearized into a 3D position measurement (block 222). This is done for all receivers for a given ping (i.e., all bobbers 140 that detect an echo from a given ping) and is incorporated into the Field-Estimate 224 using standard linear Kalman Filter techniques. This is repeated for all pings. In at least some embodiments, the implementation of this algorithm can easily handle sub-sets of the acoustic field, can easily incorporate ray bending and propagation time inputs that come from the propagation model, and include identified points in the signal stream as well. The output of the process of block 202 are a set of final acoustic field estimates 230 that are provided to the Kirchoff Migration block 174 of FIG. 7.

Referring again to FIG. 7, the Kirchoff Migration module 174 receives the outputs of the bobber path reconstruction module 166 (i.e., the aforementioned final acoustic field estimates 230) and the scattered energy acoustic field 172 and uses this information to generate classifiable data 182 that is provided to a detector/classifier module 160, where the detector/classifier module 160 is, in one embodiment, automated and is, in one embodiment, performed by a human user. The detector/classifier module helps determine whether the data indicates an object was found, and, if so, is there enough information to identify the object, and, if so, what the object is (or likely is). It should be noted that Kirchoff Migration is but one exemplary type of migration usable in accordance with the disclosed embodiments, as will be appreciated. As explained in U.S. Pat. No. 5,629,904 (which is hereby incorporated by reference), migration generally is a process which maps seismic pulses which are recorded in the time domain into a depth domain through a wave equation and a suitable velocity field. In some instances, migration can be an inversion operation involving rearrangement of acoustic information elements so that reflections and diffractions are plotted at their true locations. Kirchoff migration is an example of a migration method for reconstruction of spatial (depth) images from time domain reflection signals. Migration related operations typically operate on uninterpreted data using some form of, or approximation of, the wave equation by way of one of several solutions: solution in the space time domain by a finite-difference method; solution in the integral form (which Kirchoff migration uses); solution in the frequency domain; or solution by a combination of the previously mentioned domains. Examples of migrating techniques are shown in U.S. Pat. Nos. 4,464,737; 4,479,205; 4,745,585; 5,198,797 and U.S. Statutory Invention Registration No. H482, each of which is hereby incorporated by reference.

Figure 9:
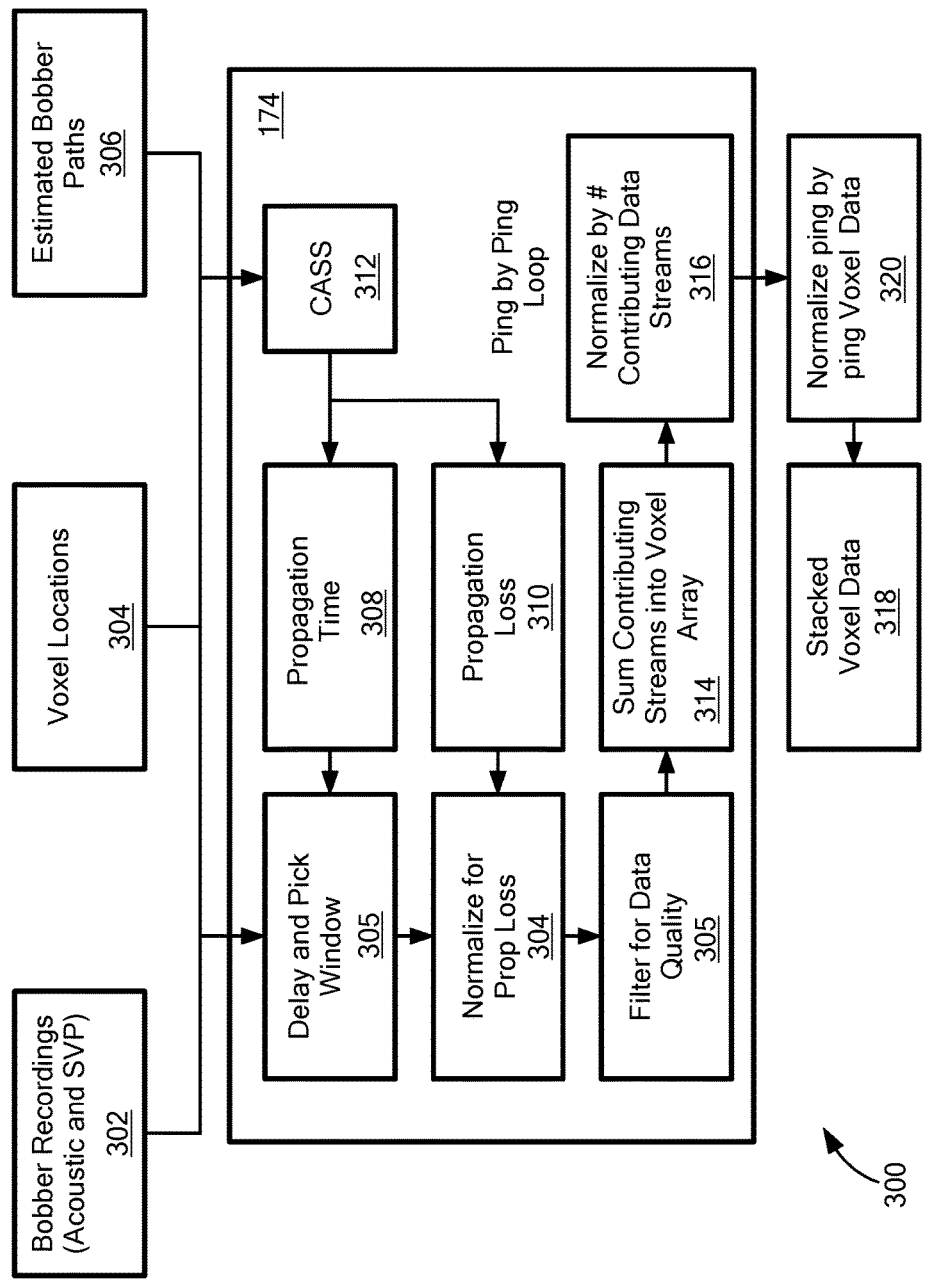
FIG. 9 is an exemplary migration block diagram for the BFDCL system of FIG. 7, in accordance with at least one embodiment.
Figure 10:
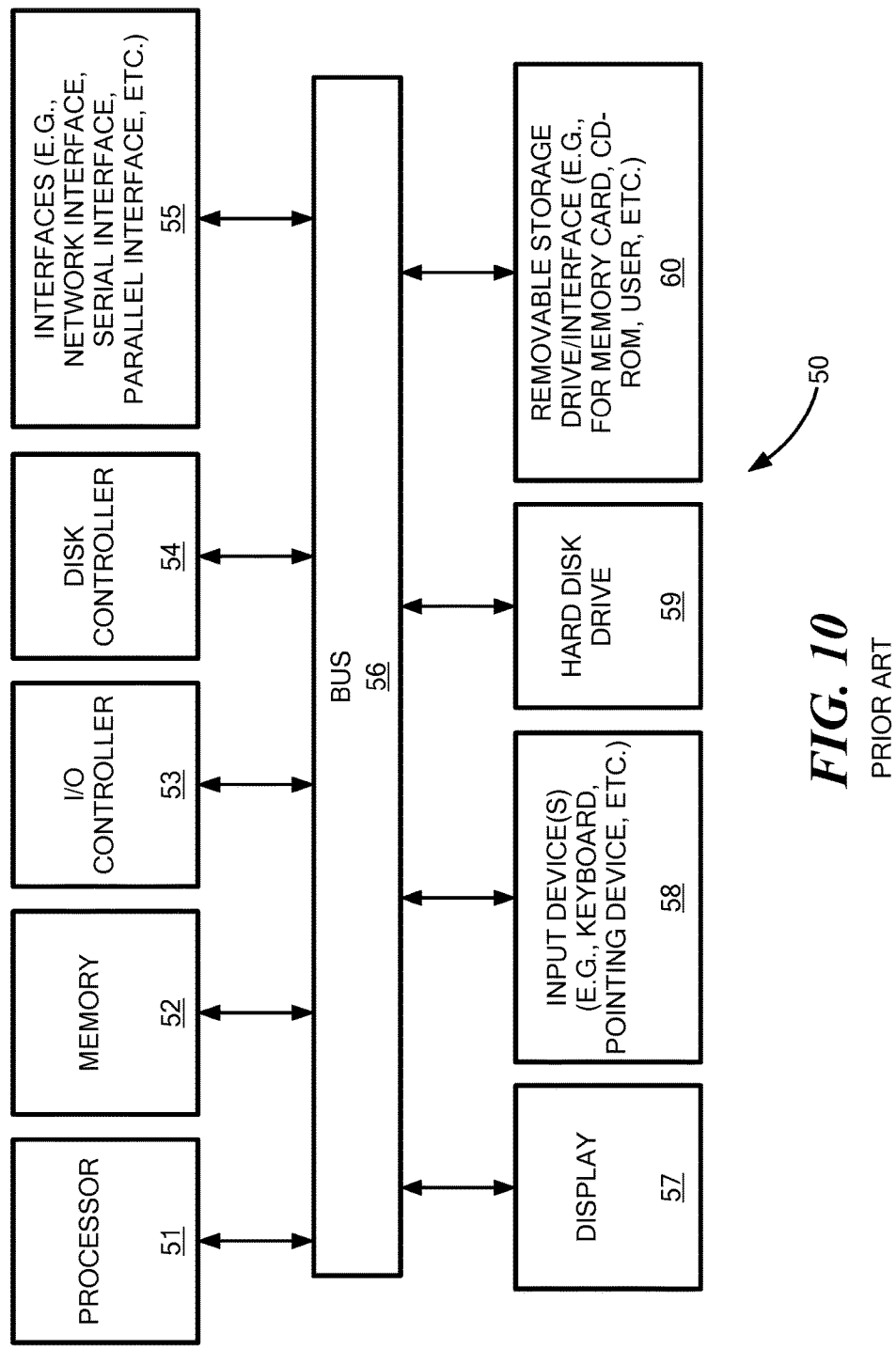
FIG. 10 is a block diagram of a computer system usable with at least some embodiments, including at least the system of FIG. 2-9, in accordance with one embodiment.

FIG. 9 is an exemplary migration block diagram 300 for the BFDCL system of FIG. 7, in accordance with at least one embodiment. The block diagram 300 of FIG. 9 shows in greater detail the processing taking place in block 174 of FIG. 7. Referring to FIGS. 7 and 9, the inputs to the migration block 174 of FIG. 9 include is a set of bobber recordings 302, a set of voxel locations 304, and a set of estimated bobber paths 306.

The set of bobber 140 recordings 302, include the SVP bobber recordings 152 of FIG. 7, as well as the corresponding Eigenray files 180. The set of bobber 140 recordings 302 also includes the acoustic recordings 156 of FIG. 7, as processed into the scattered acoustic energy field 172. The voxel locations 304 of FIG. 9 correspond to the three dimensional coordinate locations of the bobbers 140, as derived from the GPS bobber recording 154 (FIG. 7). The estimated bobber paths 306 correspond to the output of the bobber path reconstruction block 166 (FIGS. 7 and 8).

In the migration block 174 of FIG. 8, all of the processing done occurs for all the data that is received during a given "ping" (where it is assumed that all of the bobbers 140, which are synchronized, were "pinging" at substantially the same times, respectively during the sink/float excursions—e.g., all at once). The delay and pick window 305 receives and processes the bobber recordings 302, voxel locations 304, and estimated bobber paths 306. In addition, the CASS model 312, based at least in part on information provided by or derived from the bobber recordings 302, voxel locations 304, and estimated bobber paths 306, also provides information relating to propagation time 308 and propagation loss 310 for sounds in the water at the locations (e.g., voxel locations 304) and paths (e.g., estimated bobber paths 306) where the bobbers 140 were deployed during at least a portion of the sink/float mission. Based on the propagation time 308 and propagation loss 310 the information is normalized (blocks 302, 304), through techniques known in the art. In the filter for data quality block 305 of FIG. 9, the normalized outputs are determined. The filtered data streams are then summed together (block 314) into a voxel array. The voxel array is normalized based at least in part based on the number of contributing data streams (block 316). This all contributes to an output of block 174 that consists, for each ping, of a set of voxel data for that ping, where the voxel data corresponds to the coordinates of potentially detected objects. In one embodiment, this ping by ping voxel data can, optionally, be normalized (block 320). Then, a set of stacked voxel data is provided and is usable for the detection/classification block 160 of FIG. 1. The set of stacked voxel data corresponds, in one embodiment, to set of three dimensional coordinates corresponding, effectively, to a three dimensional image of the volume of water that was scanned by the array of bobbers 140. This three dimensional image can be inverted to reveal the detected object.

As the above descriptions for FIGS. 2-9 demonstrate, at least some of the embodiments described herein provide ways to gather, during a given sink/float mission, both information relating to an acoustic interrogation of the water environment and, at substantially the same time, information relating to sound velocity profile in the same volume of water, as well as ways to adjust the detected acoustic interrogation data based on the dynamically collected sound velocity profile information. As noted above, any or all of the above-described embodiments can be performed using software and/or hardware. In at least one embodiment, a computer system is used to help implement some or all of the embodiments described herein.

For example, FIG. 10 is a block diagram of a computer system usable with at least some embodiments, including at least the system of FIG. 2-9, in accordance with one embodiment. FIG. 10 shows a block diagram of a computer system 50 usable for providing some or all of the functionality described herein. For example, the computer system 50 can be used to implement the remote computation server 160, the computer system 50 onboard a deployment and/or receiver vehicle 15 with at least some embodiments. In at least some embodiments, portions of the computer system 50 can even be embodied in the receiver 13 and/or the bobbers 140. The computer system 50 also can be used to implement all or part of any of the methods, equations, function blocks, modules, algorithms, processes, and/or calculations described herein.

Referring again to the computer system 50 of FIG. 10, systems and methods in accordance with at least some embodiments can be implemented using any type of computer system running any one or more types of operating systems. Exemplary types of computer systems on which at least some embodiments can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, combination phone-tablet computer, music playing device, electronic reading device) server, workstation, and interconnected group of computers, as well as any other type of device having a microprocessor installed or embedded thereto, such as a field-programmable gate array (FPGA).

The exemplary computer system 50 of FIG. 10 includes a central processor 1, associated memory 2 for storing programs and/or data, an input/output controller 3, a disk controller 4, a network interface 5, a display device 7, one or more input devices 8, a fixed or hard disk drive unit 9, a removal storage device/drive (optional) 13, optionally a backup storage device (e.g., a tape drive unit) (not shown) and a data bus 6 coupling these components to allow communication therebetween.

The central processor 1 can be any type of microprocessor, such as a PENTIUM-family processor, made by Intel of Santa Clara, Calif. The display device 7 can be any type of display, such as a liquid crystal display (LCD), plasma display, cathode ray tube display (CRT), light emitting diode (LED), and the like, capable of displaying, in whole or in part, any desired information. The input device 8 can be any type of device capable of providing the desired inputs, such as keyboards, numeric keypads, touch screens, pointing devices, switches, styluses, and light pens. The network interface 5 can be any type of a device card, adapter, or connector that provides the computer system 50 with network access to a computer or other device, such as a printer. For example, the network interface 5 can enables the computer system 50 to connect to a computer network such as the Internet. Other computer accessories that are now known or developed in the future (e.g., microphones, cameras, speakers, biometric access-control devices such as fingerprint scanners, etc.), although not illustrated in the block diagram of FIG. 14, can of course be included as part of the computer system 50.

Computer systems embodying at least some embodiments described herein need not include every element shown in FIG. 10, and that equivalents to each of the elements are intended to be included within the spirit and scope of the described embodiments.

In at least one embodiment, one or more computer programs define at least some of the operational capabilities of the computer system 50. These programs can be loaded into the computer system 50 in many ways, such as via the hard disk drive 9, the removable storage driver 13, or the network interface 5 (e.g., wirelessly, via the Internet, etc.). Alternatively, the programs can reside in a permanent memory portion (e.g., a read-only-memory (ROM)) chip) of the main memory 2. In another embodiment, the computer system 50 can include specially designed, dedicated, hard-wired electronic circuits that perform all functions described herein without the need for instructions from computer programs.

In at least one embodiment, the computer system 50 is networked to other devices, such as in a client-server or peer to peer system. The computer system 50 can, for example, be a client system, a server system, or a peer system. In addition, at least one embodiment is implemented at the server side and receives and responds to requests from a client, such as a reader application running on a user computer.

The client can be any entity, such as a the computer system 50, or specific components thereof (e.g., terminal, personal computer, mainframe computer, workstation, handheld device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), an Internet appliance, a telephone, an electronic reader device, or any other such device connectable to the computer network.

The server can be any entity, such as the computer system 50, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some embodiments resides in an application running on the computer system 50. At least one embodiment is embodied in a computer-readable program medium usable with the general purpose computer system 50. At least one embodiment is embodied in a data structure stored on a computer or a computer-readable program medium. At least one embodiment is embodied in an application programming interface (API) or a user interface. In addition, at least one embodiment is embodied in a data structure.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, in tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments.

Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety.

What is claimed is:

1. A system for generating an image of an acoustic field associated with an underwater region, the system comprising:

a plurality of submersible sensing devices (SSDs) disposed so as to be substantially separate from each other in the underwater region, each respective SSD configured to execute a sink/float mission in water, the sink/float mission comprising movement of the SSD from at least a first depth in water to at least a second depth in water, each respective SSD comprising:
  an environmental sensor configured to measure, during at least a portion of the sink/float mission, at least one environmental parameter along at least a portion of a path taken by the SSD during a sink/float mission;
  a position sensor configured to detect position information associated with the SSD during at least a portion of the sink/float mission, during a least a portion of the sink/float mission; wherein the position information further comprises at least one of:
    (a) a first set of position information taken at substantially the same time that at least one environmental parameter is being measured; and
    (b) a second set of position information taken at substantially the same time that at least one underwater acoustic signal is being detected;
  an acoustic detection sensor configured to detect, during at least a portion of the sink/float mission, at least one underwater acoustic signal during at least a portion of the sink/float mission;
  a data recording system in operable communication with the environmental sensor, the position sensor, and the acoustic detection sensor, the data recording system configured to record a set of mission data during at least a portion of the sink/float mission, the set of mission data comprising data from the environmental sensor, data from the position sensor, and data from the acoustic detection sensor;
  a buoyancy control system configured to control buoyancy of the SSD during the sink/float mission; and
  a communications system configured to transmit, at a predetermined time, at least a portion of the mission data from the SSD to a processor located remotely from the plurality of SSDs; and
a processor in operable communication with the plurality of SSDs, the processor configured to:
  receive the set of mission data from at least a portion of the plurality of SSDs; and
  generate an acoustic field image based at least in part on the received mission information.

2. The system of claim 1, wherein the position information further comprises at least one voxel position of the SSD and wherein the processor is further configured to:
  determine, based on the received mission data, a set of corresponding respective path, and voxel position information for each respective SSD in the portion of the plurality of SSDs, during each respective sink/float mission undertaken by the respective SSD in the portion of the plurality of SSDs;
  generate, based at least in part on the at least one environmental parameter, a propagation model of the underwater region;
  perform a first adjustment of at least one of the path, voxel position, and detected acoustic signal information for each SSD based at least in part on the propagation model; and
  generate the acoustic field image based at least in part on the path, voxel position, and detected acoustic information after the first adjustment.

3. The system of claim 1 wherein the SSD further comprises an acoustic transmitter configured to transmit from the SSD at least one unique transmitted signal at a frequency compatible with transmission in water.

4. The system of claim 3, wherein the unique transmitted signal comprises an orthogonal high time-bandwidth signal.

5. The system of claim 3, wherein each of the plurality of the SSDs comprises an acoustic sensor configured to use two-way bi-static reflection sensing to detect acoustic signals.

6. The system of claim 3, wherein the at least one acoustic signal comprises monostatic and bistatic reflected returns.

7. The system of claim 6, wherein, for a given respective SSD, at least a portion of the reflected returns comprise reflections based at least in part on the at least one unique transmitted signal sent from that given respective SSD.

8. The system of claim 5, wherein the processor is further configured to:
perform a second adjustment of at least one of the path, voxel position, and detected acoustic signal information based at least in part on information relating to two-way bistatic reflection sensing between two or more SSDs; and
generate an acoustic field image based at least in part on the path, voxel position, and detected acoustic information after the first and second adjustments.

9. The system of claim 1, wherein the processor is configured to generate a sound velocity profile (SVP) based at least in part on the measured environmental parameter.

10. The system of claim 1, wherein at least a portion of the plurality of SSDs is configured to be synchronized in time during at least one sink/float mission.

11. The system of claim 1, wherein the SSD comprises at least one of a sonobuoy, bobber, and dropsonde.

12. The system of claim 1, wherein at least a portion of the SSDs are configured such that their respective transmitted signals overlap in interrogation radius without causing interference with other respective transmitted signals.

13. The system of claim 1, wherein, for at least a portion of the plurality of SSD devices, the first set of position information is taken at substantially the same time as the second set of position information.

14. A submergible sensing device (SSD) configured to execute a sink/float mission in water, the sink/float mission comprising movement of the SSD from at least a first depth in water to at least a second depth in water, the SSD comprising:
an environmental sensor configured to measure, during at least a portion of the sink/float mission, at least one environmental parameter along at least a portion of a path taken by the SSD during a sink/float mission;
a position sensor configured to detect position information during at least a portion of the sink/float mission, the position information comprising at least one voxel position of the SSD, during a least a portion of the sink/float mission, wherein the position information further comprises at least one of:
(a) a first set of position information taken at substantially the same time that at least one environmental parameter is being measured; and
(b) a second set of position information taken at substantially the same time that at least one underwater acoustic signal is being detected;
an acoustic detection sensor configured to detect, during at least a portion of the sink/float mission, the at least one underwater acoustic signal;
a data recording system in operable communication with the environmental sensor, the position sensor, and the acoustic detection sensor, the data recording system configured to record a set of mission data during at least a portion of the sink/float mission, the set of mission data comprising data from the environmental sensor, data from the position sensor, and data from the acoustic detection sensor; and
a buoyancy control system configured to control buoyancy of the SSD during the sink/float mission.

15. The SSD device of claim 12, further comprising a communications system configured to transmit, at a predetermined time, at least a portion of the mission data from the SSD to a processor located remotely from the SSD.

16. The SSD of claim 14, further comprising an acoustic transmitter configured to transmit from the SSD at least one unique orthogonal high time-bandwidth signal.

17. The SSD of claim 16, wherein the at least one acoustic signal comprises monostatic and bistatic reflected returns and wherein at least a portion of the reflected returns comprise reflections based at least in part on the at least one unique orthogonal high time-bandwidth signal transmitted from the SSD.

18. A method of generating an image of an acoustic field, the method comprising the unordered steps of:
(a) measuring at least one environmental parameter along at least a portion of a first underwater path;
(b) detecting, along at least a portion of the first underwater path, at least one underwater acoustic signal;
(c) detecting position information during at least a portion the first underwater path, wherein the position information comprises at least one of
(c-1) a first set of position information taken at substantially the same time that at least one environmental parameter is being measured; and
(c-2) a second set of position information taken at substantially the same time that at least one underwater acoustic signal is being detected;
(d) defining a set of mission data during at least a portion of the first underwater path, the set of mission data comprising the environmental parameter, the underwater signal, and the position information; and
(e) generating, based at least in part on the set of mission data, a respective first acoustic field image associated with an underwater region defined around the first underwater path.

19. The method of claim 18, further comprising the unordered steps of:
(f) simultaneously performing steps (a)-(d) for a plurality of separate and distinct underwater paths; and
(g) generating, based at least in part on the respective sets of mission data from step (f), a second acoustic field image associated with an underwater region defined around the plurality of separate and distinct underwater paths.

20. The method of claim 19, further comprising the unordered steps of
(h) transmitting an orthogonal high time-bandwidth signal originating from at least a portion of the first underwater path; and
(i) detecting, along at least a portion of the first underwater path, reflections based at least in part on the at least one unique orthogonal high time-bandwidth signal; and
(j) including the detected reflections in the set of mission data.

* * * * *